(12) United States Patent
Lee et al.

(10) Patent No.: US 12,446,850 B2
(45) Date of Patent: Oct. 21, 2025

(54) ULTRASOUND IMAGING DEVICE AND OPERATION METHOD THEREOF

(71) Applicant: SAMSUNG MEDISON CO., LTD., Gangwon-do (KR)

(72) Inventors: Donggue Lee, Seoul (KR); Sangha Song, Seoul (KR); Gunwoo Lee, Seoul (KR); Hokyung Kang, Seoul (KR); Jaekwang Lee, Seoul (KR)

(73) Assignee: SAMSUNG MEDISON CO., LTD., Gangwon-Do (KR)

( * ) Notice: Subject to any disclaimer, the term of this patent is extended or adjusted under 35 U.S.C. 154(b) by 332 days.

(21) Appl. No.: 17/797,647

(22) PCT Filed: Dec. 16, 2020

(86) PCT No.: PCT/KR2020/018463
§ 371 (c)(1),
(2) Date: Aug. 4, 2022

(87) PCT Pub. No.: WO2021/187725
PCT Pub. Date: Sep. 23, 2021

(65) Prior Publication Data
US 2023/0058450 A1    Feb. 23, 2023

(30) Foreign Application Priority Data
Mar. 20, 2020  (KR) .................. 10-2020-0034668

(51) Int. Cl.
*A61B 8/08* (2006.01)
*A61B 8/00* (2006.01)
*A61B 8/14* (2006.01)

(52) U.S. Cl.
CPC ............ *A61B 8/085* (2013.01); *A61B 8/14* (2013.01); *A61B 8/461* (2013.01); *A61B 8/469* (2013.01); *A61B 8/5207* (2013.01); *A61B 8/5223* (2013.01)

(58) Field of Classification Search
None
See application file for complete search history.

(56) References Cited

U.S. PATENT DOCUMENTS 6,238,342 B1 *   5/2001  Feleppa ............. A61B 17/3403
                                                        600/437
8,600,133 B2    12/2013  Buelow et al.
(Continued)

FOREIGN PATENT DOCUMENTS

CN    105263420 A    1/2016
CN    110192893 A    9/2019
(Continued)

OTHER PUBLICATIONS

Extended European Search Report issued Dec. 7, 2023 for European Patent Application No. 20925242.8.
(Continued)

*Primary Examiner* — Amelie R Davis
(74) *Attorney, Agent, or Firm* — Morgan Lewis & Bockius LLP

(57) ABSTRACT

Provided is an ultrasound imaging device and an operation method thereof. An embodiment of the present disclosure provides an ultrasound imaging device comprising: an ultrasound probe; a display unit; a memory for storing at least one instruction; and a processor for executing the at least one instruction stored in the memory, wherein the processor: image-processes an echo signal to acquire multiple ultrasound images; calculates suitability indicating, as a numerical value, whether the multiple acquired ultrasound images are suitable as input images for a diagnosis algorithm for (Continued)

diagnosing a lesion; displays the calculated suitability on the display unit; and determines an input ultrasound image, which is to be input into the diagnosis algorithm, among the multiple ultrasound images based on the suitability.

13 Claims, 16 Drawing Sheets

(56) References Cited

U.S. PATENT DOCUMENTS

| | | |
|---|---|---|
| 9,204,860 B2 | 12/2015 | Ji et al. |
| 10,709,425 B2 | 7/2020 | Waechter-Stehle et al. |
| 10,743,841 B2 | 8/2020 | Kong et al. |
| 11,006,926 B2 | 5/2021 | Labyed |
| 2011/0170755 A1 | 7/2011 | Buelow et al. |
| 2015/0325036 A1 | 11/2015 | Lee |
| 2016/0143621 A1 | 5/2016 | Parthasarathy et al. |
| 2017/0273669 A1 | 9/2017 | Schneider |
| 2018/0049720 A1 | 2/2018 | Anand |
| 2018/0140282 A1 | 5/2018 | Toyomura et al. |
| 2022/0071600 A1* | 3/2022 | Canfield .................. G06N 3/08 |

FOREIGN PATENT DOCUMENTS

| | | |
|---|---|---|
| JP | 4005856 B2 | 11/2007 |
| JP | 2012-504449 A | 2/2012 |
| JP | 2016-041117 A | 3/2016 |
| JP | 2016-514564 A1 | 5/2016 |
| JP | 6066642 B2 | 1/2017 |
| JP | 6382633 B2 | 8/2018 |
| JP | 6467041 B2 | 1/2019 |
| JP | 2019-088576 A | 6/2019 |
| KR | 10-1415667 B1 | 7/2014 |
| KR | 10-2016-0058812 A | 5/2016 |
| KR | 10-1649725 B1 | 8/2016 |

OTHER PUBLICATIONS

Supplementary European Search Report issued Jan. 3, 2024 for European Patent Application No. 20925242.8.
International Search Report dated Apr. 8, 2021 issued in International Patent Application No. PCT/KR2020/018463 (with English translation).
Office Action dated Sep. 18, 2024, issued in corresponding European Patent Application No. 20925242.8.
Office Action dated Dec. 4, 2024, issued in corresponding Korean Patent Application No. 10-2020-0034668 with an English translation.
Chinese Office Action dated Feb. 27, 2025 issued in Chinese Patent Application No. 2020800098761.2 (with English translation).
Chinese Second Office Action dated Jul. 30, 2025 issued in Chinese Patent Application No. 202080098761.9 (with English translation).
Korean Notice of Allowance dated Aug. 25, 2025 issued in Korean Patent Application No. 10-2020-0034668 (with English translation).

* cited by examiner

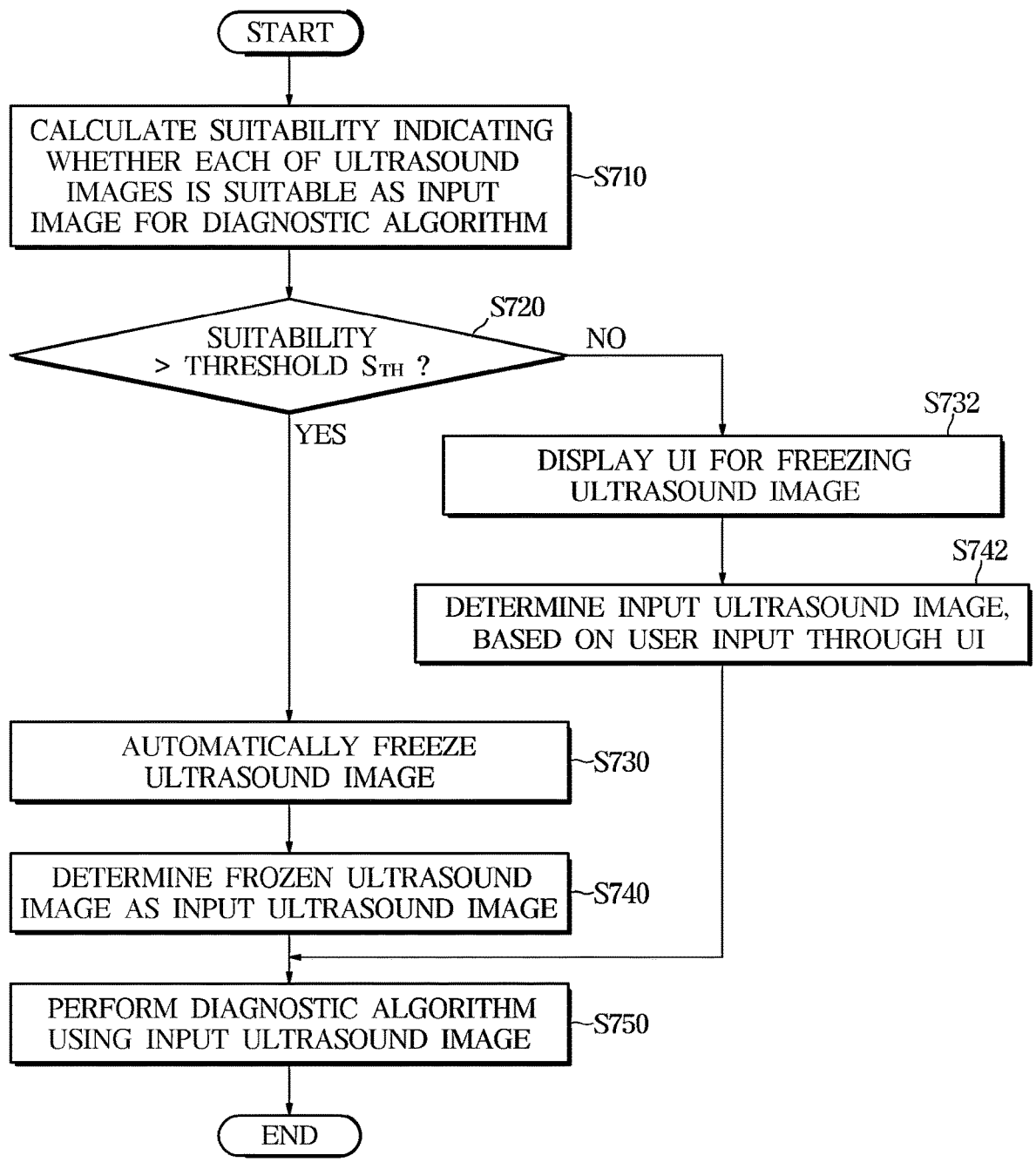

ULTRASOUND IMAGING DEVICE AND OPERATION METHOD THEREOF

CROSS-REFERENCE OF RELATED APPLICATIONS

This application is the U.S. National Phase under 35 U.S.C. § 371 of International Patent Application No. PCT/KR2020/018463, filed on Dec. 16, 220, which in turn claims the benefit of Korean Application No. 10-2020-0034668, filed on Mar. 20, 2020, the entire disclosures of which applications are incorporated by reference herein.

TECHNICAL FIELD

The present disclosure relates to an ultrasound imaging device and an operation method thereof. Specifically, the present disclosure relates to an ultrasound imaging device for determining an optimal ultrasound image to be input as an input image to a diagnostic algorithm for diagnosing a lesion, and an operation method thereof.

BACKGROUND ART

An ultrasound imaging device emits an ultrasound signal generated from a transducer of a probe to an object and receives information from an ultrasound echo signal reflected from the object to obtain at least one image of an inner part (e.g., soft tissue or blood flow) of the object.

In recent years, automated measurement and diagnostic algorithms have been used to automatically measure biometric data or diagnose a lesion using ultrasound images. In an automated measurement and diagnostic algorithm, unique setting values related to an anatomical structure, a scan view and image settings are determined according to a type of an input ultrasound image. An ultrasound image to be input to the automated measurement and diagnostic algorithm is determined according to subjective and qualitative criteria of an examiner (user) and thus results obtained through the automated measurement and diagnostic algorithm may not be uniform and may vary. For example, the accuracy of a result of a diagnostic algorithm may decrease due to factors such as noise caused by an examiner (user), motion artifacts due to a patients movement, subjective and qualitative selection of an anatomical structure output in an ultrasound image, or unique artifacts of an ultrasound wave (e.g., a shadow due to ribs in an ultrasound image of the liver), and a measurement time may increase, thereby decreasing efficiency.

In particular, effects of machine-learning-based measurement and diagnostic algorithms that have recently been widely used may vary according to training data. However, data obtained for learning, when actually used, is different from data obtained by various examiners (users) in terms of an anatomical view and scan conditions, thus reducing the accuracy of a result of a diagnostic algorithm.

DISCLOSURE

Technical Solution

The present disclosure provides an ultrasound imaging device for determining an input ultrasound image to be input to a diagnostic algorithm according to quantitative criteria while excluding a user's subjective and qualitative criteria to increase the accuracy of diagnosing a lesion through the diagnostic algorithm, and an operation method thereof.

DESCRIPTION OF DRAWINGS

FIG. 7 is a flowchart of an example of an ultrasound imaging device of the present disclosure freezing an ultrasound image based on a calculated value of suitability and performing a diagnostic algorithm using the frozen ultrasound image.

BEST MODE

Figure 1:
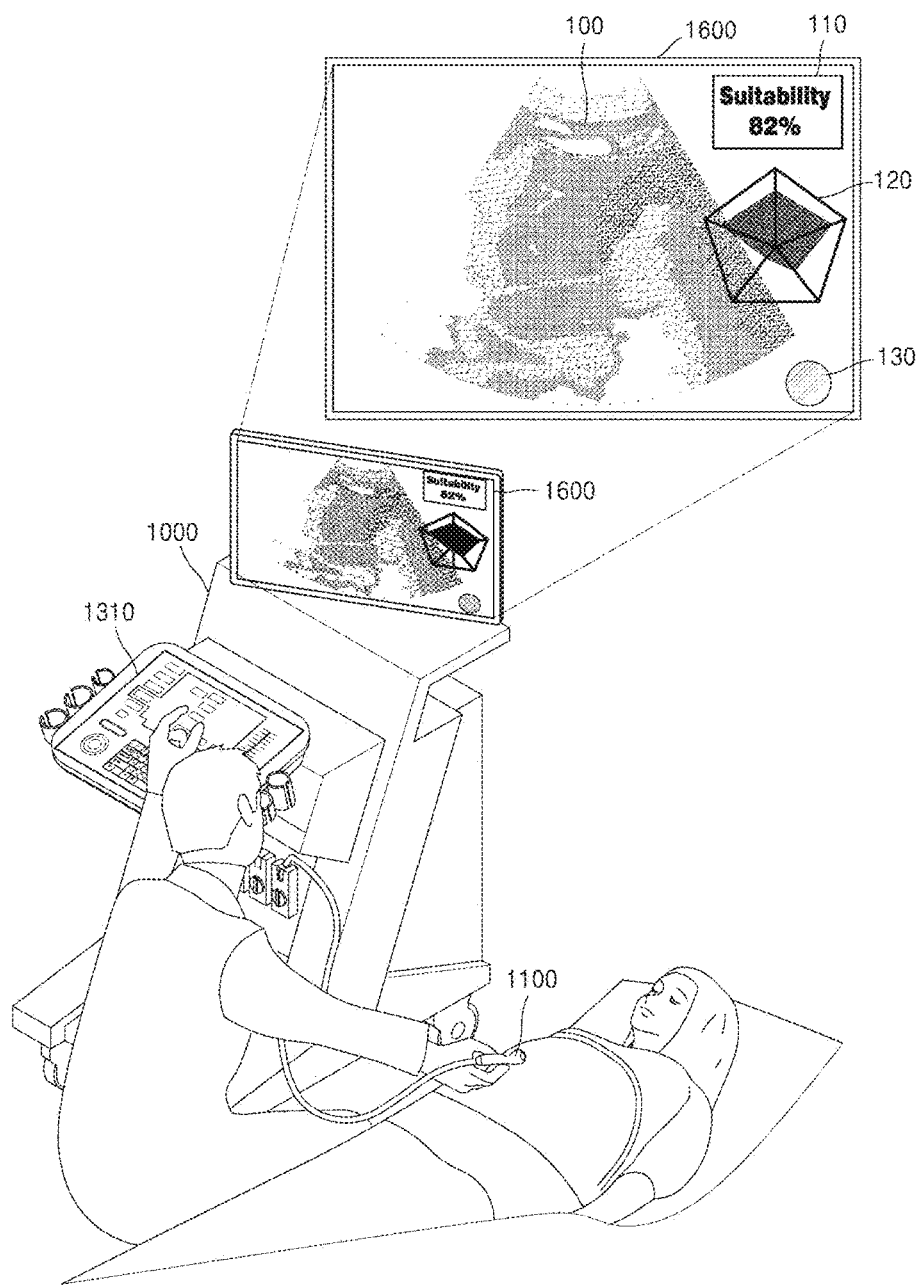
FIG. 1 is a conceptual diagram for describing an operation of an ultrasound imaging device according to an embodiment of the present disclosure.

According to an aspect of the present disclosure, an operation method of an ultrasound imaging device includes obtaining a plurality of ultrasound images by receiving an echo signal reflected from an object using an ultrasound probe and image-processing the received echo signal, calculating suitability of each of the plurality of ultrasound images as an input image for a diagnostic algorithm for diagnosing a lesion, the suitability being a numerical value, displaying the calculated suitability on a display of the ultrasound imaging device, and determining an input ultrasound image to be input to the diagnostic algorithm among the plurality of ultrasound images based on the suitability.

For example, the calculating of the suitability may include calculating suitability for the diagnostic algorithm based on at least one of an anatomical view, quality, or a setting value of a scan parameter of each of the plurality of ultrasound images.

For example, the calculating of the suitability may include calculating suitability of each of the plurality of ultrasound images for the diagnostic algorithm based on at least one of echogenicity, an anatomical view, a motion artifact, a preset of scan parameters, or a rate of shadows of each of the plurality of ultrasound images.

For example, the calculating of the suitability may include calculating suitability for the diagnostic algorithm by training a pre-trained deep neural network using the plurality of ultrasound images as input data, and the pre-trained deep neural network may be an artificial neural network trained using a plurality of previously obtained ultrasound images as input data and a numerical value of the suitability as an output value.

For example, the displaying of the suitability may include displaying the calculated suitability together with a name of the diagnostic algorithm.

For example, the displaying of the suitability may include displaying the suitability together with an ultrasound image of which the suitability is calculated among the plurality of ultrasound images.

For example, the determining of the ultrasound image may include automatically freezing an ultrasound image of which the calculated suitability is greater than a preset threshold among the plurality of ultrasound images.

For example, the determining of the ultrasound image may include receiving a user input for freezing an ultrasound image among the plurality of ultrasound images based on a numerical value of the calculated suitability, and determining the input ultrasound image to be input to the diagnostic algorithm by freezing an ultrasound image based on the received user input.

For example, when the calculated suitability is greater than a preset threshold, the operation method may further include displaying, on the display, a user interface (UI) for determining an ultrasound image of which the suitability is calculated as an input image to be input to the diagnostic algorithm.

For example, the operation method may further include loading at least one ultrasound image previously captured and stored in a memory of the ultrasound imaging device, measuring a similarity between the at least one loaded ultrasound image and the plurality of obtained ultrasound images, and determining at least one ultrasound image of which the measured similarity is greater than a threshold preset in relation to the similarity, and the calculating of the suitability may include calculating suitability of the at least one determined ultrasound image for the diagnostic algorithm.

According to an aspect of the present disclosure, an ultrasound imaging device includes an ultrasound probe configured to transmit an ultrasound signal to an object and receive an echo signal reflected from the object, a display, a memory storing at least one instruction, and a processor configured to execute the at least one instruction stored in the memory, wherein the processor obtains a plurality of ultrasound images by image-processing the echo signal, calculates suitability of each of the plurality of ultrasound images as input image for a diagnostic algorithm for diagnosing a lesion, the suitability being a numerical value, controls the display to display the calculated suitability on the display, and determines an input ultrasound image to be input to the diagnostic algorithm among the plurality of ultrasound images based on the suitability.

For example, the processor may calculate suitability of each of the plurality of ultrasound images for the diagnostic algorithm based on at least one of an anatomical view, quality, or a setting value of a scan parameter of each of the plurality of ultrasound images.

For example, the processor may calculate suitability of each of the plurality of ultrasound images for the diagnostic algorithm based on at least one of echogenicity, an anatomical view, a motion artifact, a preset of scan parameters, or a rate of shadows of each of the plurality of ultrasound images.

For example, the processor may calculate suitability for the diagnostic algorithm by training a pre-trained deep neural network using the plurality of ultrasound images as input data, and the pre-trained deep neural network may be an artificial neural network trained using a plurality of previously obtained ultrasound images as input data and a numerical value of the suitability as an output value.

For example, the processor may control the display to display the calculated suitability together with a name of the diagnostic algorithm.

For example, the processor may control the display to display an ultrasound image of which the suitability is calculated among the plurality of ultrasound images, together with the suitability.

For example, the processor may automatically freeze an ultrasound image of which the calculated suitability is greater than a preset threshold among the plurality of ultrasound images.

For example, the ultrasound imaging device may further include a user inputter configured to receive a user input for freezing an ultrasound image among the plurality of ultrasound images based on a numerical value of the calculated suitability, and the processor may determine the input ultrasound image to be input to the diagnostic algorithm by freezing an ultrasound image based on a user input received through the user inputter.

For example, the processor may control the display to display, on the display, a user interface (UI) for determining an ultrasound image of which the suitability is calculated as an input image to be input to the diagnostic algorithm, when the calculated suitability is greater than a preset threshold.

An aspect of the present disclosure provides a computer-readable recording medium storing a computer executable program.

[Modes of the Invention]

In embodiments of the present disclosure, general terms that are widely used nowadays are selected, if possible, in consideration of functions of the present disclosure, but non-general terms may be selected according to the intentions of technicians in the art, precedents, or new technologies, etc. Some terms may be arbitrarily chosen by the present applicant, and in this case, the meanings of these terms will be explained in corresponding parts of embodiments in detail. Accordingly, the terms used herein should be defined not based on the names thereof but based on the meanings thereof and the whole context of the present disclosure.

As used herein, the singular expressions are intended to include plural forms as well, unless the context clearly indicates otherwise. Terms used herein, including technical or scientific terms, may have the same meanings as commonly understood by those of ordinary skill in the technical field described herein.

Throughout the present disclosure, it will be understood that when an element is referred to as "including" another element, the element may further include other elements unless mentioned otherwise. Terms such as "unit," "module," and the like, when used herein, represent units for processing at least one function or operation, which may be implemented by hardware, software, or a combination of hardware and software.

The expression "configured to" used herein may be interchangeably used with, for example, "suitable for," "having the capacity to," "designed to," "adapted to," "made to," or "capable of," depending on the situation. The expression "configured to" need not necessarily be understood only as "specifically designed to" in terms of hardware. Instead, in some situations, the expression "system configured to" may be understood to mean the system "to be configured to" do something together with other devices or components. For example, the phrase "processor configured to perform A, B, and C" may be understood to mean a dedicated processor (e.g., an embedded processor) for performing a corresponding operation or a generic-purpose processor (e.g., a CPU or an application processor) capable of executing one or more software programs stored in a memory to perform corresponding operations.

As used herein, the term "ultrasound image" should be understood to mean an image of an object processed based on an ultrasound signal transmitted to the object and an ultrasound signal reflected from the object.

As used herein, the term "object" should be understood to mean an object to be photographed, including a human, an animal, or a part of a human or animal. For example, an object should be understood to include a part of the body (e.g., an organ or the like) or a phantom.

Throughout the present specification, the term "user" may be understood to mean, but is not limited to, a medical professional, such as a doctor, a nurse, a clinical pathologist, or a medical image expert, or a technician who repairs medical devices.

Hereinafter, embodiments of the present disclosure will be described in detail with reference to the accompanying drawings.

FIG. 1 is a conceptual diagram for describing an operation of an ultrasound imaging device 1000 according to an embodiment of the present disclosure.

The ultrasound imaging device 1000 of FIG. 1 is a device that receives an ultrasound echo signal from an ultrasound probe 1100 and image-processes the ultrasound echo signal to generate an ultrasound image of an inner part of the body of an object, i.e., a patient. The ultrasound imaging device 1000 may be a cart type but is not limited thereto. The ultrasound imaging device 1000 may be embodied as a portable type including at least one of a picture archiving communication system (PACS) viewer, a smart phone, a laptop computer, a tablet PC, and a personal digital assistant (PDA).

Referring to FIG. 1, the ultrasound imaging device 1000 may include an ultrasound probe 1100, a control panel 1310, and a display 1600. However, the above components are examples provided only for convenience of description, and the ultrasound imaging device 1000 of the present disclosure may further include other components in addition to the above components.

The ultrasound probe 1100 may transmit an ultrasound signal to an object and receive an echo signal reflected from the object. The ultrasound imaging device 1000 may obtain ultrasound image data based on the echo signal obtained through the ultrasound probe 1100. The ultrasound imaging device 1000 may obtain a plurality of ultrasound images by image-processing the ultrasound image data. In an embodiment, the ultrasound imaging device 1000 may obtain an ultrasound image consisting of a plurality of frames in real time according to a user input for changing a scan position of the ultrasound probe 1100 on an object (e.g., a patient's abdomen) or changing a setting value of a scan parameter for capturing an ultrasound image using a control panel 1310.

The ultrasound imaging device 1000 may calculate suitability of each of a plurality of ultrasound images for a diagnostic algorithm. The diagnostic algorithm is an automated application that measures biometric data from an ultrasound image or diagnoses a lesion when an ultrasound image is input thereto. The diagnostic algorithm may analyze an image by obtaining anatomical information from an input ultrasound image or detecting characteristic points, measure biometric data or predict a lesion. In an embodiment, the diagnostic algorithm may include an algorithm based on machine learning such as deep learning. Examples of the diagnostic algorithm include a hepatorenal index (HRI) for measuring a degree of hepatic fibrosis from an ultrasound image of the liver or diagnosing fatty liver, tissue scatter distribution imaging (TSI) for measuring a degree of scattering in an ultrasound image, tissue attenuation imaging (TAI) for measuring a degree of attenuation of an ultrasound image, and the like. However, embodiments are not limited to the above examples. The "suitability" for the diagnostic algorithm is a numerical value that quantitatively indicates whether an ultrasound image is appropriate for measuring biometric data and diagnosing a lesion from the measured biometric data when the ultrasound image is input as an input image to the diagnostic algorithm.

The ultrasound imaging device 1000 may display the calculated suitability on the display 1600. In an embodiment, the display 1600 may display an obtained ultrasound image 100, a first UI 110 indicating suitability of the ultrasound image 100 for the diagnostic algorithm, a second UI 120 indicating measured values of a plurality of parameters for calculating suitability, and a third UI 130 indicating whether the ultrasound image 100 is appropriate as an input ultrasound image to be input to the diagnostic algorithm based on a numerical value of suitability. In an embodiment, the first UI 110, the second UI 120, and the third UI 130 may be implemented as graphical user interfaces.

In an embodiment, the ultrasound imaging device 1000 may determine an input ultrasound image to be input to the diagnostic algorithm among a plurality of ultrasound images obtained in real time, based on the calculated suitability. The ultrasound imaging device 1000 may measure biometric data and diagnose a lesion by performing the diagnostic algorithm using the determined input ultrasound image.

When the diagnostic algorithm is used through an ultrasound imaging device of the related art, an input ultrasound image to be input to the diagnostic algorithm is determined by a user's subjective and qualitative criteria and thus the accuracy of a result of diagnosing a lesion through the diagnostic algorithm may be low. For example, the accuracy of a result of a diagnostic algorithm may decrease due to factors such as noise caused by a user, motion artifacts due to a patient's movement, subjective and qualitative selection of an anatomical structure output in an ultrasound image, or unique artifacts of an ultrasound wave (e.g., a shadow due to ribs in an ultrasound image of the liver), and a time required for measurement through the diagnostic algorithm may increase, thereby decreasing efficiency. In particular, effects of machine-learning-based diagnostic algorithms using a deep neural network such as deep learning may vary according to training data, and data obtained for learning is different from data obtained by a user in terms of anatomical views and scan conditions, and thus decreases the accuracy of a diagnostic algorithm when actually used.

The ultrasound imaging device 1000 according to an embodiment of the present disclosure may quantitatively calculate suitability of each of a plurality of ultrasound images for the diagnostic algorithm and determine an optimal input ultrasound image to be input to the diagnostic algorithm among the plurality of ultrasound images using the calculated suitability, thereby increasing the accuracy of diagnosing a lesion through the diagnostic algorithm. Because in the ultrasound imaging device 1000 of the present disclosure, a user's experience level or other qualitative criteria are excluded in determining an input ultrasound image, even an inexperienced user may be able to obtain an optimal ultrasound image for obtaining an accurate result through the diagnostic algorithm. The ultrasound imaging device 1000 of the present disclosure may automatically determine an optimal input ultrasound image to be input to the diagnostic algorithm, thereby reducing an inspection time.

In addition, the ultrasound imaging device 1000 of the present disclosure may visually display the suitability of the ultrasound image 100 for the diagnostic algorithm on the display 1600, so that a user may intuitively identify the suitability and directly select an input ultrasound image based on the suitability. Therefore, user convenience may be improved.

Figure 2:
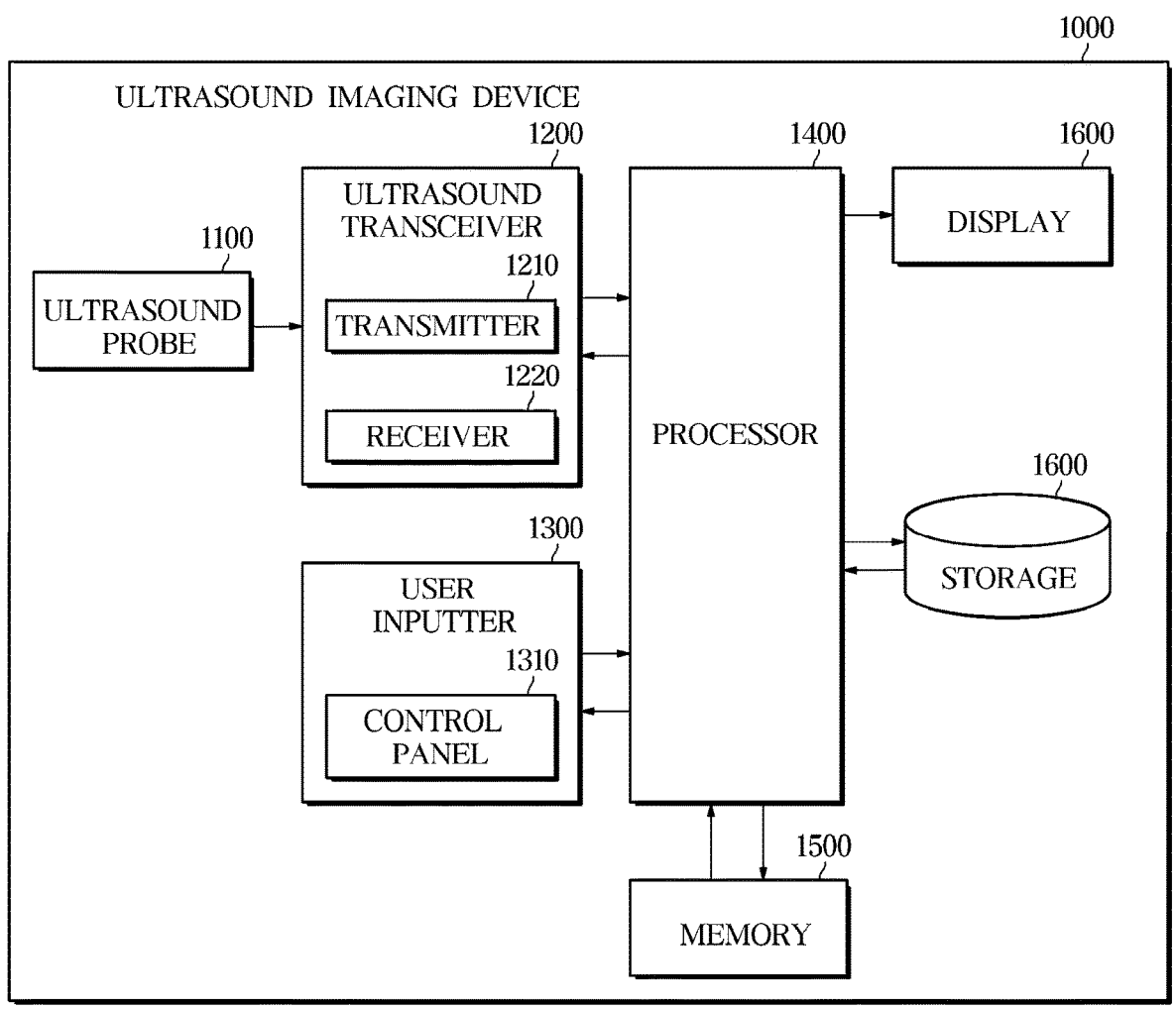
FIG. 2 is a block diagram of a configuration of an ultrasound imaging device according to an embodiment of the present disclosure.

FIG. 2 is a block diagram of a configuration of an ultrasound imaging device 1000 of the present disclosure.

Referring to FIG. 2, the ultrasound imaging device 1000 may include an ultrasound probe 1100, an ultrasound transceiver 1200, a user inputter 1300, a processor 1400, a memory 1500, a display 1600, and a storage 1700. The components shown in FIG. 2 are only examples of the present disclosure and components included in the ultrasound imaging device 1000 are not limited to the components of FIG. 2. The ultrasound imaging device 1000 may not include some of the components shown in FIG. 2 and may further include components that are not shown in FIG. 2.

The ultrasound probe 1100 may include a plurality of transducer elements to transmit an ultrasound signal to an object, i.e., a patient's body, and receive an ultrasound echo signal reflected from the patient's body. The ultrasound probe 1100 may be connected to the ultrasound imaging device 1000 via wire or wirelessly. In an embodiment, the ultrasound probe 1100 may be a standalone probe separated from the ultrasound imaging device 1000 to operate independently. Alternatively, the ultrasound imaging device 1000 may include one or more ultrasound probes 1100 according to an embodiment.

The plurality of transducer elements may transmit ultrasound signals to an object according to a transmission signal supplied from the transmitter 1210. The plurality of transducer elements may receive an ultrasound echo signal reflected from the object and form a reception signal. The processor 1400 may control the transmitter 1210 to form transmission signals to be supplied to the plurality of transducer elements in consideration of positions of the plurality of transducer elements included in the ultrasound probe 1100 and a focal point. The processor 1400 may control the receiver 1220 to generate ultrasound wave data by performing analog-to-digital (A/D) conversion on a reception signal received from the ultrasound probe 1100 and combine digital-converted reception signals in consideration of the positions of the plurality of transducer elements and a focal point.

The user inputter 1300 may receive a user input for controlling the ultrasound imaging device 1000. For example, the user inputter 1300 may receive a user input through a button, a keypad, a mouse, a trackball, a jog switch, a knob or the like or receive a touch input for touching a touch pad or a touch screen, a drag input, a swipe input, a voice input, a motion input, biometric information (e.g., iris recognition or fingerprint recognition), or the like.

The user inputter 1300 may include a control panel 1310. The control panel 1310 may include an input device for changing or adjusting a setting value of a scan parameter for capturing an ultrasound image by the ultrasound imaging device 1000. In an embodiment, the control panel 1310 may include at least one of a plurality of buttons, a trackball, a jog switch, and a knob button.

The processor 1400 may control overall operations of the ultrasound probe 1100, the ultrasound transceiver 1200, the user inputter 1300, the display 1600, and the storage 1700, and control the flow of signals between inner components of the ultrasound imaging device 1000. The processor 1400 may execute one or more instructions of a program stored in the memory 1500. The processor 1400 may include hardware components that perform an arithmetic operation, a logic operation, input/output operations, and signal processing. The processor 1400 may include, but is not limited to, for example, at least one of a central processing unit, a microprocessor, a graphics processing unit, an application specific integrated circuit (ASIC), a digital signal processor (DSP), a digital signal processing device (DSPD), a programmable logic device (PLD), or a field programmable gate array (FPGA).

The memory 1500 may store a program including instructions for controlling the ultrasound imaging device 1000. The memory 1500 may store one or more instructions and program codes readable by the processor 1400. In the following embodiment, the processor 1400 may be implemented to execute instructions or codes of a program stored in the memory 1500.

The memory 1500 may include, for example, at least one type of storage medium among a random access memory (RAM), a static random access memory (SRAM), a read-only memory (ROM), an electrically erasable programmable read-only memory (EEPROM), a programmable read-only memory (PROM), a flash memory type memory, a hard disk type memory, a multimedia card micro type memory, a card type memory (e.g., an SD or XD memory), a magnetic memory, a magnetic disk, and an optical disc.

The processor 1400 may obtain a plurality of ultrasound images by image-processing an echo signal received through the ultrasound probe 1100. In an embodiment, the processor 1400 may perform A/D conversion on an ultrasound echo signal received through the receiver 1220, combine digitally converted reception signals to generate ultrasound data, and obtain an ultrasound image consisting of a plurality of frames using the ultrasound data.

The processor 1400 may calculate suitability that is a numerical value indicating whether each of a plurality of obtained ultrasound images is appropriate as an input image to be input to a diagnostic algorithm for diagnosing a lesion. The "suitability" is a numerical value that quantitatively indicates whether an ultrasound image is appropriate for measuring biometric data and diagnosing a lesion from the measured biometric data when the ultrasound image is input as an input image to the diagnostic algorithm. The processor 1400 may calculate suitability for the diagnostic algorithm based on setting values of a parameter identified or obtained from the plurality of ultrasound images and a scan parameter that is set to capture the plurality of ultrasound images. In an embodiment, the processor 1400 may calculate suitability for the diagnostic algorithm based on at least one of an anatomical view, quality, and a setting value of a scan parameter for each of the plurality of ultrasound images. The quality of each of the plurality of ultrasound images may be measured, for example, according to at least one of echogenicity, a motion artifact, and a rate of shadows in each of the plurality of ultrasound images.

However, embodiments are not limited thereto, and the processor 1400 may calculate suitability of each of the plurality of ultrasound images for the diagnostic algorithm by training a deep neural network (DNN). In this case, the processor 1400 may use a pre-trained DNN. An embodiment in which the processor 1400 calculates suitability of a plurality of ultrasound images for a diagnostic algorithm will be described in detail with reference to FIGS. 4 and 5 below.

The processor 1400 may control the display 1600 to display the suitability calculated with respect to each of the plurality of ultrasound images on the display 1600. In an embodiment, the processor 1400 may identify a type of a diagnostic algorithm suitable for a plurality of ultrasound images based on at least one parameter among an anatomical view and a preset of scan parameters of each of the plurality of ultrasound images, and display the name of the identified diagnostic algorithm and suitability calculated with respect to the identified diagnostic algorithm on the display 1600. The processor 1400 may display a graphical user interface (GUI) for graphically displaying the size of a parameter measured to calculate the suitability on the display 1600, as well as the suitability. An embodiment in which the GUI related to the suitability is displayed will be described in detail with reference to FIGS. 6A to 6C below.

The processor 1400 may determine an input ultrasound image to be input to the diagnostic algorithm among the plurality of ultrasound images based on a numerical value of the calculated suitability. In an embodiment, the processor 1400 may automatically freeze an ultrasound image of which the calculated suitability is greater than a preset threshold among the plurality of ultrasound images. In an embodiment, the processor 1400 may automatically determine the automatically frozen ultrasound image as an input ultrasound image for performing the diagnostic algorithm.

In an embodiment, the user inputter 1300 may receive a user input for freezing an ultrasound image among the plurality of ultrasound images based on the numerical value of the calculated suitability, and the processor 1400 may freeze the ultrasound image based on the user input received through the user inputter 1300. In an embodiment, the processor 1400 may determine the ultrasound image frozen according to the user input as an input ultrasound image for performing the diagnostic algorithm. An embodiment in which the ultrasound imaging device 1000 determines an input ultrasound image based on the suitability and performs the diagnostic algorithm will be described with reference to FIG. 7 below.

In an embodiment, the processor 1400 may store a frozen ultrasound image in the storage 1700.

When the calculated suitability is greater than the preset threshold, the processor 1400 may control the display 1600 to display a UI for determining the ultrasound image of which the suitability is calculated as an input image to be input to the diagnostic algorithm on the display 1600. An embodiment of the UI for determining the input ultrasound image will be described in detail with reference to FIG. 8 below.

The processor 1400 may load at least one ultrasound image, which has been captured and stored in the storage 1700, from the storage 1700. The at least one ultrasound image is an ultrasound image of a target part, e.g., the liver, of a patient's body that is currently being photographed, and has been captured and stored in the storage 1700. The processor 1400 may measure similarities between at least one loaded ultrasound image and a plurality of newly captured ultrasound images, and determine at least one ultrasound image that has a measured similarity greater than the preset threshold as an input ultrasound image for performing the diagnostic algorithm. An embodiment in which the processor 1400 determines an input ultrasound image for performing the diagnostic algorithm among a plurality of newly captured ultrasound images using an ultrasound image stored in the storage 1700 will be described in detail with reference to FIG. 10 below.

For example, the display 1600 may be configured as, but is not limited to, a physical device including at least one of a cathode ray tube (CRT) display, a liquid crystal display (LCD), a plasma display panel (PDP) display, an organic light-emitting diode (OLED) display, a field emission display (FED), a light-emitting diode (LED) display, a visual fluorescent display (VFD), a digital light processing (DLP) display, a flat panel display, a three-dimensional (3D) display, and a transparent display. In an embodiment, the display 1600 may be embodied as a touch screen including a touch interface. When the display 1600 is embodied as the touch screen, the display 1600 may be a component integrated with the user inputter 1300 embodied as a touch panel.

Figure 8:
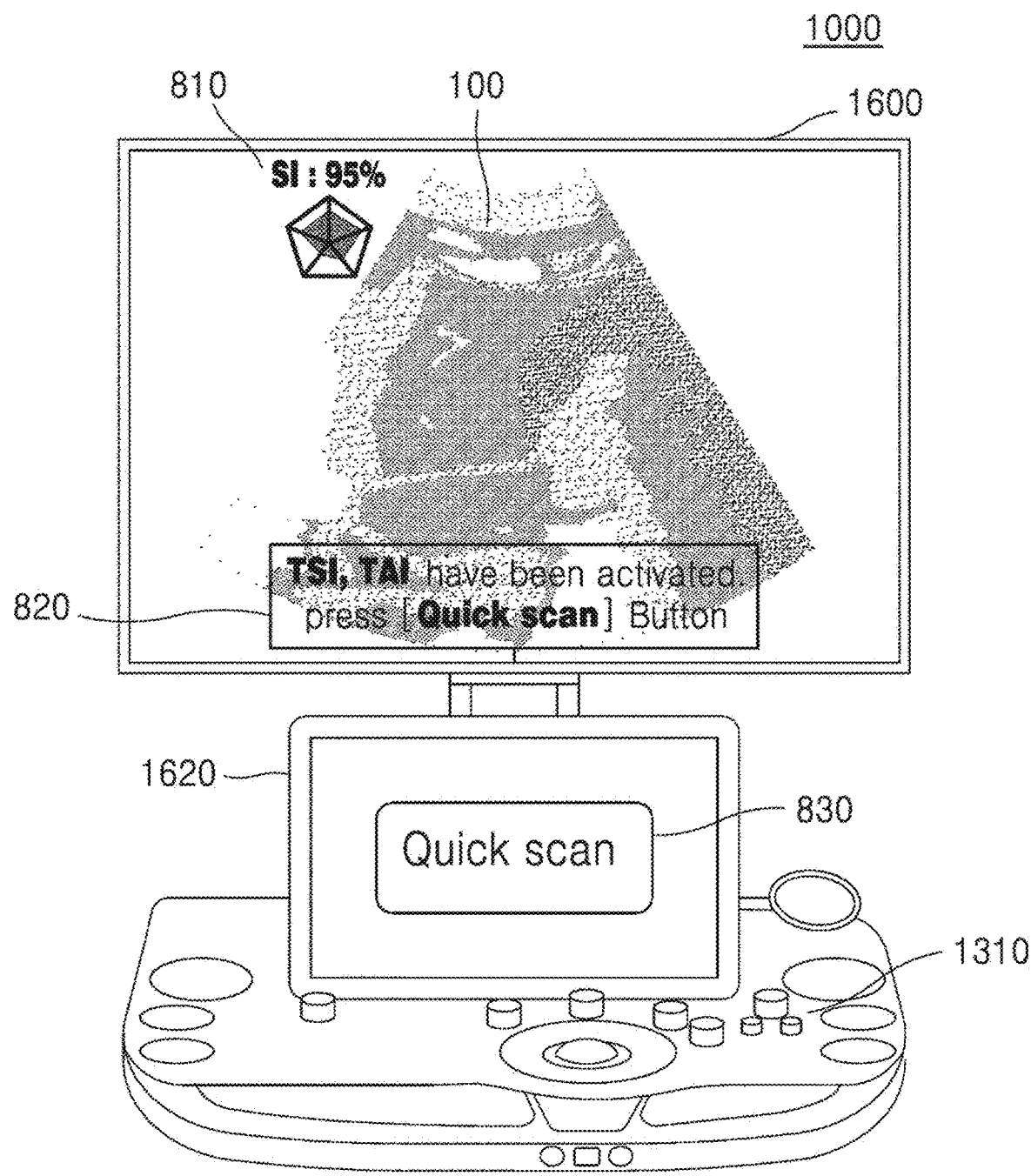
FIG. 8 is a diagram illustrating an example of an ultrasound imaging device of the present disclosure displaying a user interface (UI) for receiving a user input for determining an input ultrasound image for a diagnostic algorithm.

In an embodiment, the display 1600 may further include a sub-display. The sub-display may be integrated with the control panel 1310 and may be embodied as a touch screen with a touch panel in this case. FIG. 8 will be referred to for the sub-display.

The storage 1700 may store at least one ultrasound image captured in the past. In an embodiment, the storage 1700 may store a setting value of a scan parameter, which is set by a user, in the form of a preset. For example, the storage 1700 may store setting value information of each of scan parameters, including at least one of a gain, a dynamic range, a depth, a reject level, power, a filter, a frequency of an ultrasound signal, and time gain compensation (TGC), in the form of a user preset according to user identification information (e.g., user ID).

The storage 1700 may be configured as at least one type of nonvolatile memory among a flash memory type memory, a hard disk type memory, a multimedia card micro type memory, a card type memory (e.g., an SD or XD memory), a magnetic memory, a magnetic disk, and an optical disc. However, embodiments are not limited thereto. In an embodiment, the storage 1700 may be implemented in the form of an external database rather than an inner component included in the ultrasound imaging device 1000.

Figure 3:
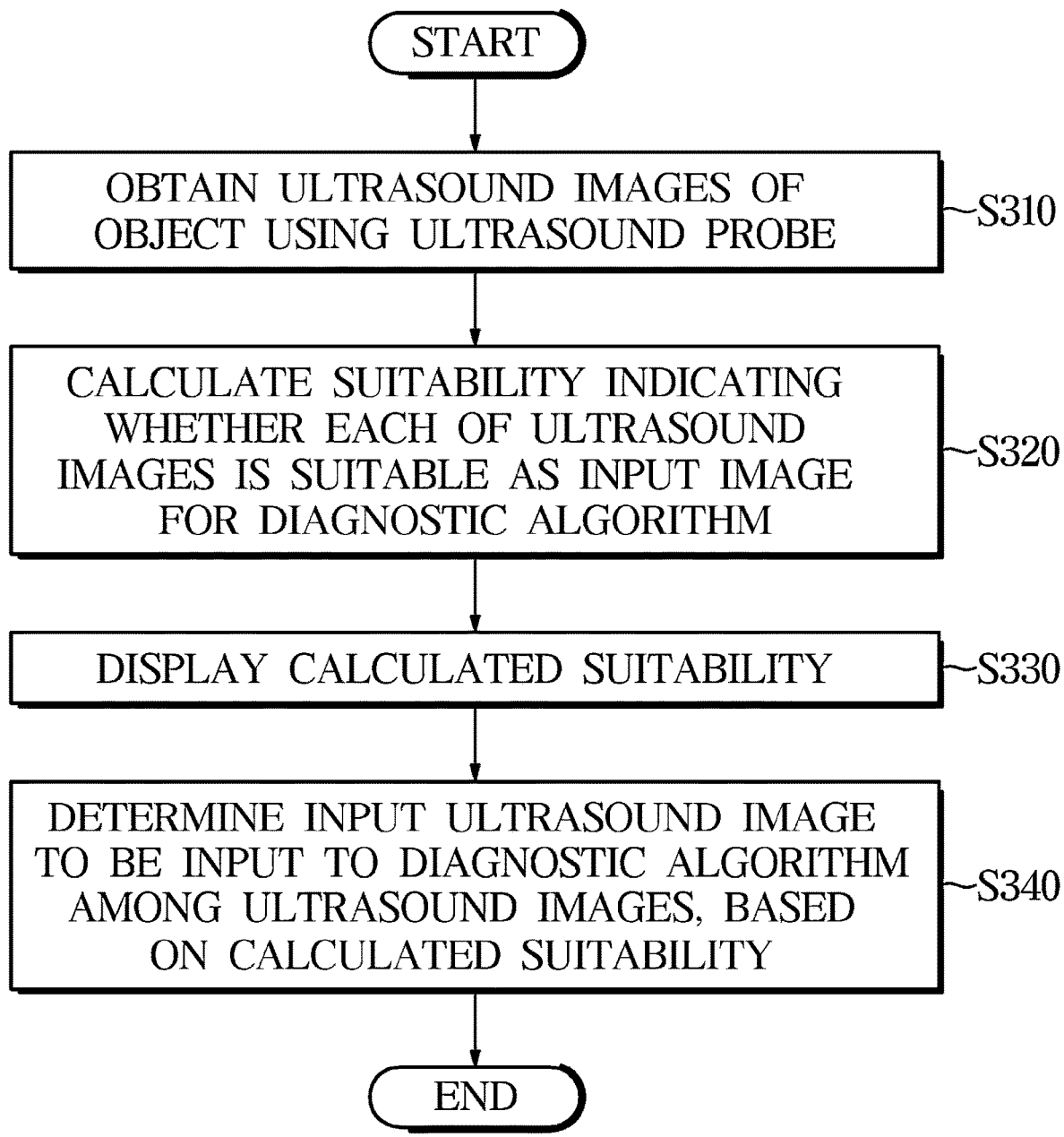
FIG. 3 is a flowchart of an operation method of an ultrasound imaging device according to an embodiment of the present disclosure.

FIG. 3 is a flowchart of an operation method of an ultrasound imaging device 1000 according to an embodiment of the present disclosure.

In operation S310, the ultrasound imaging device 1000 obtains a plurality of ultrasound images of an object using an ultrasound probe. In an embodiment, the ultrasound imaging device 1000 may obtain a plurality of ultrasound images of the object by image-processing an echo signal received using the ultrasound probe. In an embodiment, the ultrasound imaging device 1000 may obtain an ultrasound image consisting of a plurality of frames in real time according to a user input for changing a scan position of the ultrasound probe on an object (e.g., a patient's abdomen) or changing a setting value of a scan parameter for capturing an ultrasound image.

In operation S320, the ultrasound imaging device 1000 calculates suitability indicating whether each of the plurality of ultrasound images is suitable as an input image for a diagnostic algorithm. In an embodiment, the ultrasound imaging device 1000 may calculate suitability for the diagnostic algorithm based on at least one of an anatomical view and quality and a setting value of a scan parameter set to capture the plurality of ultrasound images. The ultrasound imaging device 1000 may calculate suitability of each of the plurality of ultrasound images for the diagnostic algorithm based on, for example, at least one of echogenicity, an anatomical view, a motion artifact, a preset of scan parameters, and a rate of shadows in each of the plurality of ultrasound images.

However, embodiments are not limited thereto. The ultrasound imaging device 1000 may calculate suitability for the diagnostic algorithm by training a pre-trained DNN using the plurality of ultrasound images as input data. In an embodiment, the pre-trained DNN may be an artificial neural network trained using a plurality of previously obtained ultrasound images as input data and a numerical value of the suitability as an output value.

In operation S330, the ultrasound imaging device 1000 displays the calculated suitability. In an embodiment, the ultrasound imaging device 1000 may display the suitability together with the name of the diagnostic algorithm. In an embodiment, the ultrasound imaging device 1000 may display an ultrasound image of which the suitability is calculated among the plurality of ultrasound images, together with the suitability.

In operation S340, the ultrasound imaging device 1000 may determine an input ultrasound image to be input to the diagnostic algorithm among the plurality of ultrasound images based on the calculated suitability. In an embodiment, the ultrasound imaging device 1000 may automatically freeze an ultrasound image of which the calculated suitability is greater than a preset threshold among the plurality of ultrasound images. In an embodiment, the ultrasound imaging device 1000 may receive a user input for freezing an ultrasound image among the plurality of ultrasound images based on a numerical value of the calculated suitability, and freeze the ultrasound image based on the received user input. The ultrasound imaging device 1000 may determine an ultrasound image frozen automatically or manually (according to selection through a user input) as an input ultrasound image for performing the diagnostic algorithm.

In an embodiment, when the calculated suitability is greater than the preset threshold, the ultrasound imaging device 1000 may display a UI for determining an ultrasound image of which the suitability is calculated as an input image for the diagnostic algorithm.

Figure 4:
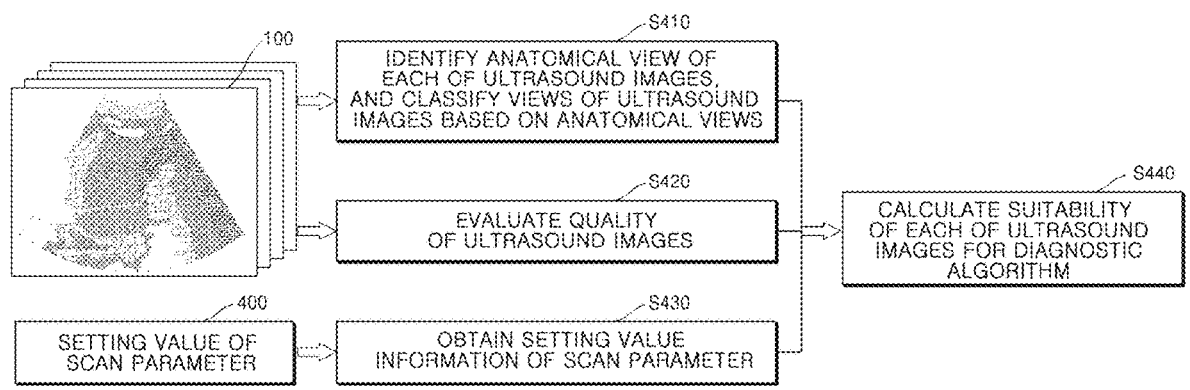
FIG. 4 is a diagram illustrating an example of an ultrasound imaging device of the present disclosure calculating suitability of each of a plurality of ultrasound images for a diagnostic algorithm.

FIG. 4 is a diagram illustrating an example of an ultrasound imaging device 1000 of the present disclosure calculating suitability of each of a plurality of ultrasound images for a diagnostic algorithm.

Referring to FIG. 4, the ultrasound imaging device 1000 may calculate suitability of each of a plurality of ultrasound images 100 for the diagnostic algorithm based on the plurality of ultrasound images 100 and information about setting values of scan parameters set to capture ultrasound images.

In operation S410, the ultrasound imaging device 1000 identifies an anatomical view of each of the plurality of ultrasound images 100 and classifies views of the plurality of ultrasound images based on the anatomical views. In an embodiment, the processor 1400 of the ultrasound imaging device 1000 of FIG. 2 may detect image views of the plurality of ultrasound images 100 and detect anatomical structures from the plurality of ultrasound images 100 using an image recognition technique. For example, the processor 1400 may detect an anatomical structure of a human, such as the liver or a kidney, from an ultrasound image using the image recognition technique. In addition, the processor 1400 may obtain seed information such as a location of at least one anatomical structure and a location of an outline, using the image recognition technique, and detect characteristic points based on the seed information. However, embodiments are not limited thereto, and the processor 1400 may detect an anatomical structure and characteristic points from an ultrasound image using a machine-learning-based model such as a pre-trained DNN.

The ultrasound imaging device 1000 may determine a standard view of a certain anatomical structure based on the detected characteristic points and classify views of the plurality of ultrasound images 100 according to the standard view. Here, the "standard view" includes conditions that an ultrasound image displayed on the ultrasound imaging device 1000 to make a diagnosis using the ultrasound image should satisfy. The standard view may include information about at least one of a position of an anatomical structure that should be included in a medical image, a size of the anatomical structure, and an orientation of the anatomical structure. For example, in a standard view of an ultrasound image of the liver, conditions of at least one of positions of the liver and kidneys, a position of blood vessels of the liver, and a rate of inclusion of the renal cortices may be defined in advance.

The processor 1400 of the ultrasound imaging device 1000 may classify the plurality of ultrasound images 100 as specific views by evaluating whether the plurality of ultrasound images 100 satisfy the conditions defined in the standard view. The processor 1400 may identify a liver kidney (LK) view from the plurality of ultrasound images 100, identify the positions of the blood vessels of the liver, the rate of inclusion of the renal cortices, etc., and determine whether the conditions defined in the standard view of the ultrasound image of the liver are satisfied to classify the views of the plurality of ultrasound images 100. In an embodiment, the processor 1400 may select a diagnostic algorithm suitable for diagnosing a lesion from among different types of diagnostic algorithms based on a result of classifying the views of the plurality of ultrasound images 100.

In operation S420, the ultrasound imaging device 1000 evaluates the quality of the plurality of ultrasound images 100. In an embodiment, the processor 1400 may detect parameters affecting the quality of the plurality of ultrasound images 100, including at least one of echogenicity, image blurring due to a motion artifact, and a rate of shadows, and evaluate the quality of the plurality of ultrasound images 100 based on the detected parameters. The echogenicity may be applied when the plurality of ultrasound images 100 are B-mode ultrasound images. A value corresponding to a pixel value of a B-mode ultrasound image may be measured as the echogenicity. A shadow is an artifact that is allowable according to unique characteristics of an ultrasound image, e.g., a shadow caused by ribs in an ultrasound image of the liver. In an embodiment, the processor 1400 may evaluate the quality of the plurality of ultrasound images 100 based on a ratio of shadows to a size of an entire ultrasound image.

In operation S430, the ultrasound imaging device 1000 obtains setting value information of a scan parameter. The scan parameter is a value set by a user to capture the plurality of ultrasound images 100 through the ultrasound imaging device 1000, and may include, for example, at least one of a gain, a dynamic range, a depth, a reject level, power, a filter, a frequency of an ultrasound signal, and time gain compensation (TGC). However, the scan parameter is not limited to the above examples. In an embodiment, the processor 1400 may obtain setting value information of each scan parameter input through the user inputter 1300 (see FIG. 2). In an embodiment, the processor 1400 may load a preset of a setting value of each scan parameter stored in the storage 1700 (see FIG. 2), and obtain setting value information of each scan parameter from the loaded preset.

In operation S440, the ultrasound imaging device 1000 calculates suitability of each of the plurality of ultrasound images 100 for a diagnostic algorithm. In an embodiment, the ultrasound imaging device 1000 may calculate suitability of each of the plurality of ultrasound images 100 for the diagnostic algorithm based on at least one of echogenicity, an anatomical view, a motion artifact, the preset of each scan parameter, and a rate of shadows in each of the plurality of ultrasound images 100. The suitability for the diagnostic algorithm may be calculated as a quantitative numerical value. For example, the suitability may be calculated as a percentage.

Figure 5:
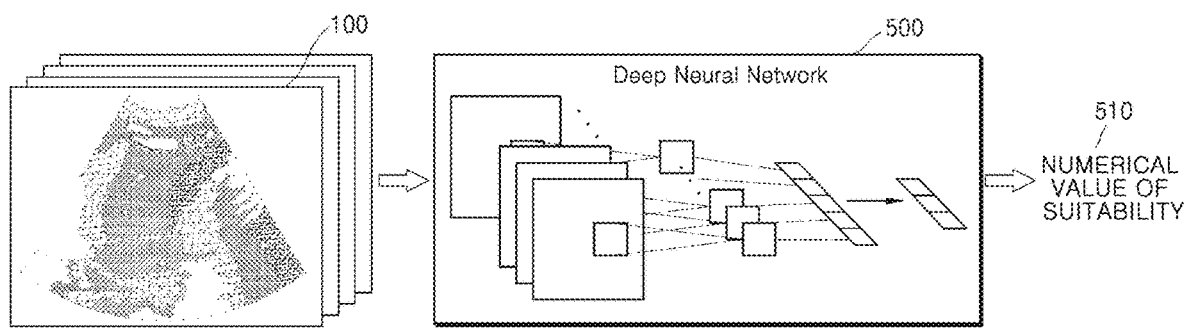
FIG. 5 is a diagram illustrating an example of an ultrasound imaging device of the present disclosure calculating suitability of each of a plurality of ultrasound images for a diagnostic algorithm.

FIG. 5 is a diagram illustrating an example of an ultrasound imaging device 1000 of the present disclosure calculating suitability of each of a plurality of ultrasound images 100 for a diagnostic algorithm.

Referring to FIG. 5, the ultrasound imaging device 1000 may obtain a numerical value of suitability 510 of a plurality of ultrasound images 100 by training a DNN 500. In an embodiment, the DNN 500 may be a convolution neural network (CNN) but is not limited thereto. The DNN 500 may be, for example, a recurrent neural network (RNN), a support vector machine (SVM), linear regression, logistic regression, naive Bayes classification, random forest, a decision tree, or a k-nearest neighbor algorithm. Otherwise, the DNN 500 may be a combination of the above examples or may be another neural network model.

The DNN 500 may include a training model and a classification model. The training model is a model that is pre-trained by inputting a plurality of previously obtained ultrasound images as input data and inputting a numerical value of suitability as an output value. For example, in the DNN 500 implemented as a CNN, the training model may be trained using a previously obtained ultrasound image of fatty liver or hepatic fibrosis as input data and using, as ground truth, a numerical value obtained by normalizing a magnetic resonance imaging derived proton density fat fraction (MRI-PDFF) value or a value of a biopsy result, and thus may include a model parameter (e.g., a weight) obtained through the training. As another example, in the DNN 500 implemented as a CNN, the training model may be trained using a previously obtained ultrasound image as input data and using, as ground truth, a numerical value obtained by normalizing suitability of a diagnostic algorithm measured based on at least one of echogenicity, an anatomical view, motion artifact, a preset of scan parameters, and a rate of shadows in each of previously obtained ultrasound images, and include a model parameter obtained through the training.

When the DNN 500 is implemented as a CNN, the training model may include, for example, a plurality of convolution layers having a feature vector obtained through a convolution operation using a filter, a pooling layer for pooling a value of a convolution layer, a fully connected layer connecting a plurality of layers, etc.

The classification model is a model trained by inputting the plurality of ultrasound images 100 to the training model including a pre-trained model parameter. The classification model is a model to which the pre-trained training model is applied using a large amount of data and has a high processing speed, i.e., is capable of performing processing in real time. The ultrasound imaging device 1000 may obtain the numerical value of suitability 510 of the plurality of ultrasound image 100 for the diagnostic algorithm by training the classification model of the DNN 500 by inputting the plurality of ultrasound images 100 as input data.

Figure 6A:
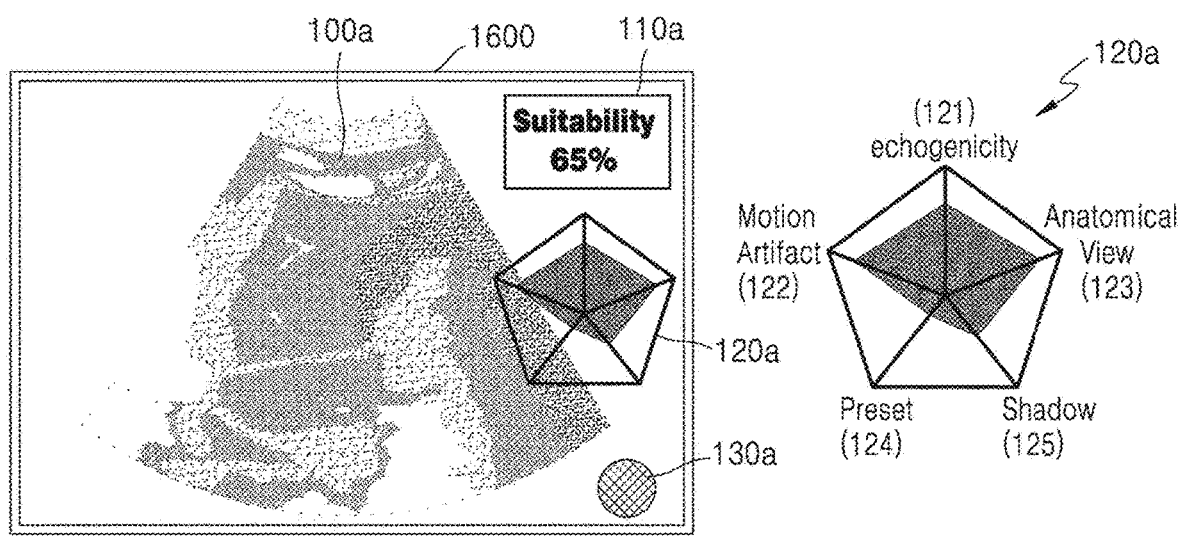
FIGS. 6A to 6C are diagrams illustrating examples of an ultrasound imaging device of the present disclosure displaying suitability of an ultrasound image for a diagnostic algorithm.
Figure 6B:
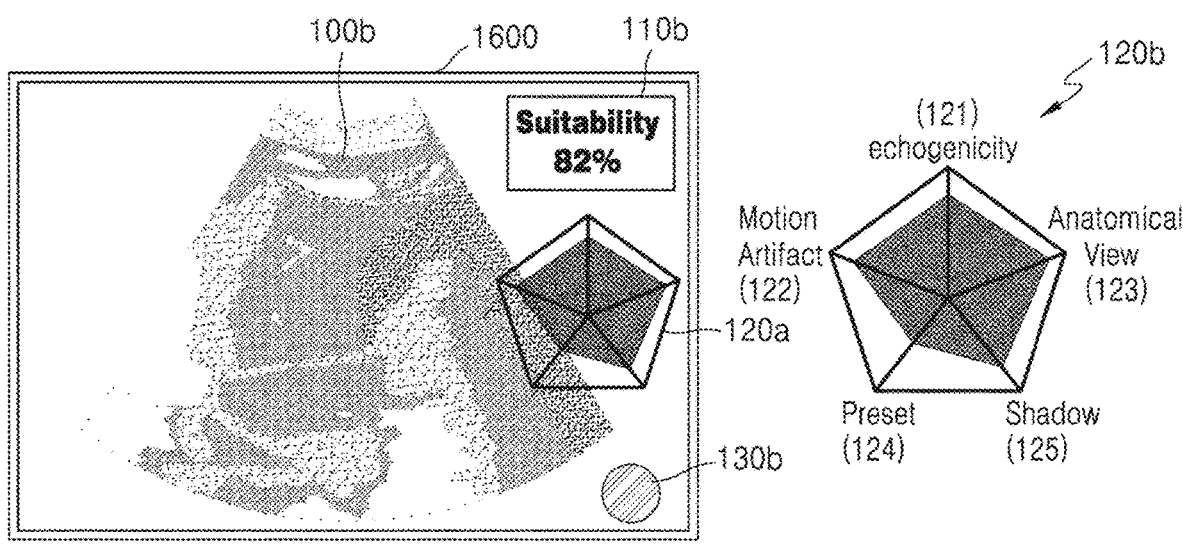
Figure 6C:
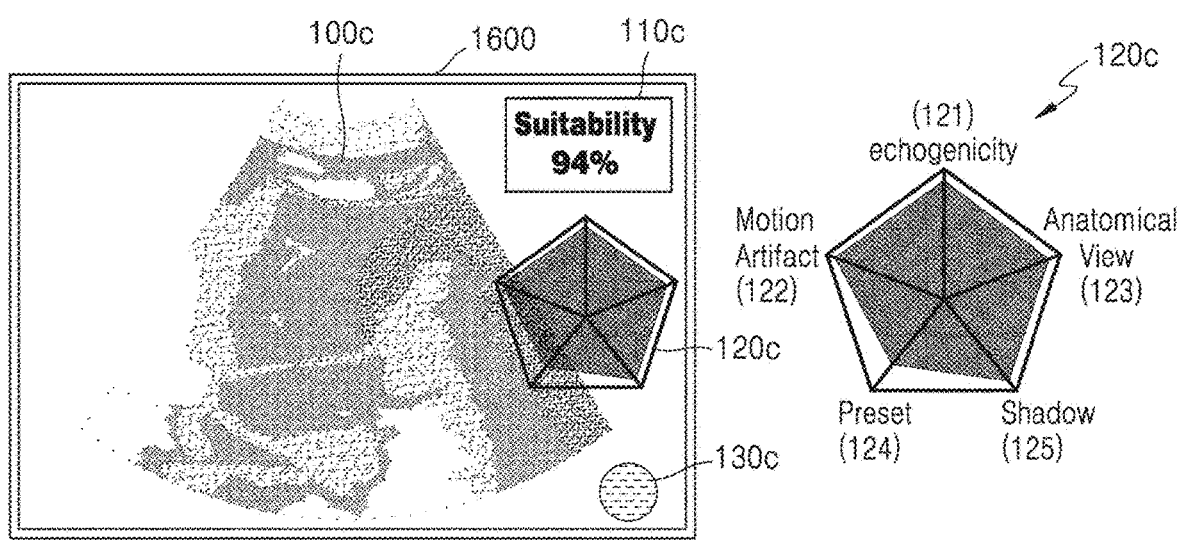

FIGS. 6A to 6C are diagrams illustrating examples of an ultrasound imaging device 1000 of the present disclosure displaying suitability of an ultrasound image 100 for a diagnostic algorithm.

Referring to FIG. 6A, the display 1600 of the ultrasound imaging device may display an ultrasound image 100a, a first UI 110a indicating suitability of the ultrasound image 100a for a diagnostic algorithm, a second UI 120a indicating measured values of a plurality of parameters for calculating suitability, and a third UI 130a indicating whether the ultrasound image 100a is suitable as an input ultrasound image to be input to the diagnostic algorithm based on a numerical value of suitability. In an embodiment, the first UI 110a, the second UI 120a, and the third UI 130a may be implemented as graphical user interfaces.

The first UI 110a may indicate the suitability of the ultrasound image 100a for the diagnostic algorithm as a numerical value. For example, the first UI 110a may indicate the suitability as a percentage. In an embodiment of FIG. 6A, the suitability of the ultrasound image 100a for the diagnostic algorithm may be 65%, and the first UI 110a may indicate a numerical value of the suitability as 65%.

The second UI 120a may indicate measurement values of the plurality of parameters corresponding to the conditions for calculating the suitability of the ultrasound image 100a for the diagnostic algorithm. The plurality of parameters may include at least one of echogenicity, a motion artifact, an anatomical view, a preset of scan parameters, and a rate of shadows. In an embodiment, the second UI 120a may include an echogenicity measurement value 121 that is a measurement value of echogenicity of the ultrasound image 100a, a motion artifact measurement value 122 that is a measurement value of a motion artifact, an anatomical view measurement value 123 that is a measurement value indicating a degree to which an anatomical view detected in the ultrasound image 100a satisfies an anatomical view defined in the diagnostic algorithm, a preset measurement value 124 that is a measurement value indicating whether a preset of a setting value of a scan parameter is similar to a setting value of a scan parameter defined in the diagnostic algorithm, and a shadow measurement value 125 that is a measurement value of a rate of shadows, and a combination of the measurement values may be displayed in the form of a UI having a pentagonal shape.

The third UI 130a may indicate whether the ultrasound image 100a is appropriate as an input ultrasound wave to be input to the diagnostic algorithm based on the numerical value of the suitability. In an embodiment, the third UI 130a may indicate whether the ultrasound image 100a is suitable for the diagnostic algorithm using a color or shadow. For example, the third UI 130a may be displayed in red when the numerical value of the suitability of the ultrasound image 100a for the diagnostic algorithm is equal to or less than a first threshold, which is a reference value indicating unsuitability, and thus the ultrasound image 100a is not suitable as an input image. For example, the third UI 130a may be displayed in green when the numerical value of the suitability of the ultrasound image 100a for the diagnostic algorithm is greater than a second threshold, which is a reference value indicating suitability, and thus the ultrasound image 100a is suitable as an input image. For example, the third UI 130a may be displayed in yellow when the numerical value of the suitability of the ultrasound image 100a for the diagnostic algorithm falls within a preset intermediate range. In the embodiment of FIG. 6A, because the numerical value of the suitability of the ultrasound image 100a for the diagnostic algorithm is 65%, the third UI 130a may be displayed in red.

Referring to FIG. 6B, a display 1600 may display a first UI 110b, a second UI 120b, and a third UI 130b. The first UI 110b, the second UI 120b, and the third UI 130b are the same as the first UI 110a, the second UI 120a, and the third UI 130a shown in FIG. 6A and thus redundant description thereof is omitted here.

In an embodiment of FIG. 6B, suitability of an ultrasound image 100b for the diagnostic algorithm may be 82%, and the first UI 110b may indicate a numerical value of the suitability as 82%. For example, the third UI 130b may be displayed in yellow when a numerical value of the suitability is a value between 70% and 90%. In the embodiment shown in FIG. 6B, the third UI 130b may be displayed in yellow because the measurement value of the suitability is 82%.

Referring to FIG. 6C, the display 1600 may display a first UI 110c, a second UI 120c, and a third UI 130c. The first UI 110c, the second UI 120c, and the third UI 130c are the same as the first UI 110a, the second UI 120a, and the third UI 130a shown in FIG. 6A and thus redundant description thereof is omitted here.

In an embodiment of FIG. 6C, suitability of an ultrasound image 100c for the diagnostic algorithm may be 94%, and the first UI 110c may indicate a numerical value of the suitability as 94%. The third UI 130c may be displayed in green indicating that the ultrasound image 110c is suitable as an input image to be input to the diagnostic algorithm when a numerical value of the suitability is greater than a second threshold that is a reference value indicating suitability. In an embodiment shown in FIG. 6C, the third UI 130c may be displayed in green because the measurement value of the suitability is 94%.

FIG. 7 is a flowchart of an example of an ultrasound imaging device 1000 of the present disclosure freezing an ultrasound image based on a calculated value of suitability and performing a diagnostic algorithm using the frozen ultrasound image.

In operation S710, the ultrasound imaging device 1000 calculates suitability indicating whether each of a plurality of ultrasound images is suitable as an input image for the diagnostic algorithm. In an embodiment, the processor 1400 of the ultrasound imaging device 1000 may calculate suitability of each of the plurality of ultrasound images for the diagnostic algorithm, for example, based on at least one of echogenicity, an anatomical view, a motion artifact, a preset of scan parameters, and a rate of shadows in each of the plurality of ultrasound images.

However, embodiments are not limited thereto. The processor 1400 of the ultrasound imaging device 1000 may calculate suitability for the diagnostic algorithm by training a pre-trained DNN using the plurality of ultrasound images as input data. In an embodiment, the pre-trained DNN may be an artificial neural network trained using a plurality of previously obtained ultrasound images as input data and a numerical value of the suitability as an output value.

In operation S720, the ultrasound imaging device 1000 compares the calculated suitability with a preset threshold $S_{th}$.

When it is determined that the calculated suitability is greater than the preset threshold $S_{th}$, the ultrasound imaging device 1000 automatically freezes an ultrasound image (operation S730). In an embodiment, when a user obtains an ultrasound image including a plurality of frames according to an input for changing a scan position of an ultrasound probe on an object (e.g., a patient's abdomen) or changing a setting value of a scan parameter for capturing an ultrasound image, the ultrasound imaging device 1000 may automatically freeze an ultrasound image of which the calculated suitability for the diagnostic algorithm is greater than a preset threshold among ultrasound images obtained in real time.

In operation S740, the ultrasound imaging device 1000 determines the frozen ultrasound image as an input ultrasound image. In an embodiment, the processor 1400 of the ultrasound imaging device 1000 may store the frozen ultrasound image in the storage 170) (see FIG. 2).

When it is determined that the calculated suitability is less than the threshold, the ultrasound imaging device 1000 displays a UI for freezing an ultrasound image (operation S732).

In operation S742, the ultrasound imaging device 1000 determines an input ultrasound image based on a user input through the UI. In an embodiment, the ultrasound imaging device 1000 may receive a user input for touching a UI or selecting a UI through an input using the control panel 1310 (see FIG. 2), and determine an input ultrasound image based on the received user input. However, embodiments are not limited thereto.

In an embodiment, the ultrasound imaging device 1000 may receive a user input for directly selecting one of ultrasound images obtained in real time, and determine an input ultrasound image to be input to perform the diagnostic algorithm based on the received user input.

Operations S730 and S740 are examples of the ultrasound imaging device 1000 automatically freezing an ultrasound image based on the calculated suitability and determining an input ultrasound image, and operations 732 and 742 are examples of determining an input ultrasound image based on a user input, i.e., manually. Although FIG. 7 illustrates that an input ultrasound image is determined manually only when a calculated suitability is equal to or less than a threshold, embodiments of the present disclosure are not limited thereto. The ultrasound imaging device 100) may determine an input ultrasound image based on a user input even when a value of the suitability is less than or equal to the threshold.

In operation S750, the ultrasound imaging device 1000 performs the diagnostic algorithm using the input ultrasound image.

FIG. 8 is a diagram illustrating an example of an ultrasound imaging device 1000 of the present disclosure displaying a UI for receiving a user input for determining an input ultrasound image 100 for a diagnostic algorithm.

Referring to FIG. 8, the ultrasound imaging device 1000 may display an ultrasound image 100, a suitability UI 810 indicating suitability of the ultrasound image 100 for a diagnostic algorithm, and a diagnostic algorithm notification UI 820 on a display 1600. In an embodiment, when a user obtains ultrasound images in real time by a user changing a scan position of the ultrasound probe 1100 (see FIG. 2) on an object or according to an input of the user changing a setting value of a scan parameter for capturing an ultrasound image using the control panel 1310, the processor 1400 (see FIG. 2) of the ultrasound imaging device 1000 may classify views of the obtained ultrasound images based on a standard view and select a diagnostic algorithm appropriate for diagnosing a lesion from among a plurality of types of diagnostic algorithms according to a result of the classification. In the embodiment shown in FIG. 8, the processor 1400 may determine a tissue attenuation imaging (TAI) algorithm and a tissue scatter distribution imaging (TSI) algorithm as diagnostic algorithms appropriate to diagnose a lesion from the ultrasound image 100. The TAI algorithm is a diagnostic algorithm for diagnosing a lesion of fatty liver by digitizing a degree of attenuation of an ultrasound image of the liver, and the TSI algorithm is a diagnostic algorithm for diagnosing a lesion of fatty liver by digitizing a degree of scattering of an ultrasound image of the liver.

The processor 1400 may display the diagnostic algorithm notification UI 820 on the display 1600 to inform a user of operability of the determined diagnostic processor.

In an embodiment, the processor 1400 may display an automatic shooting UI 830 on a sub-display 1620 to receive a user input for performing automatic shooting using the determined diagnostic algorithm. However, embodiments are not limited thereto, and the automatic shooting UI 830 may be displayed on the display 1600.

The ultrasound imaging device 1000 may receive a user input for selecting the automatic shooting UI 830 using either a touch input for touching the automatic shooting UI 830 or a button of a control panel 1310, and perform a diagnostic algorithm according to the user input. In the embodiment of FIG. 8, the ultrasound imaging device 1000 may perform the diagnostic algorithm by inputting the ultrasound image 100 as an input image to the TSI algorithm and the TAI algorithm, measure numerical values indicating scattering and attenuation of the ultrasound image 100, and diagnose a lesion related to fatty liver.

Figure 9A:
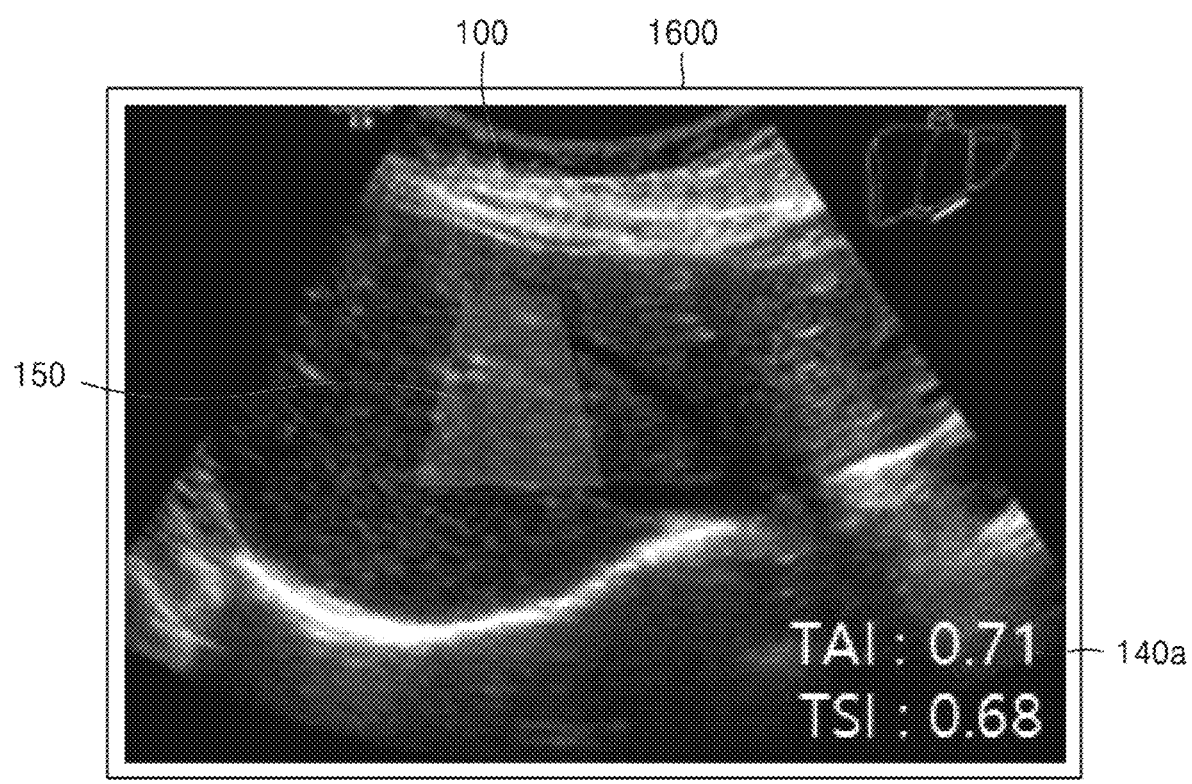
FIGS. 9A and 9B are diagrams illustrating examples of an ultrasound imaging device of the present disclosure displaying a type of a diagnostic algorithm suitable for an ultrasound image and suitability.
Figure 9B:
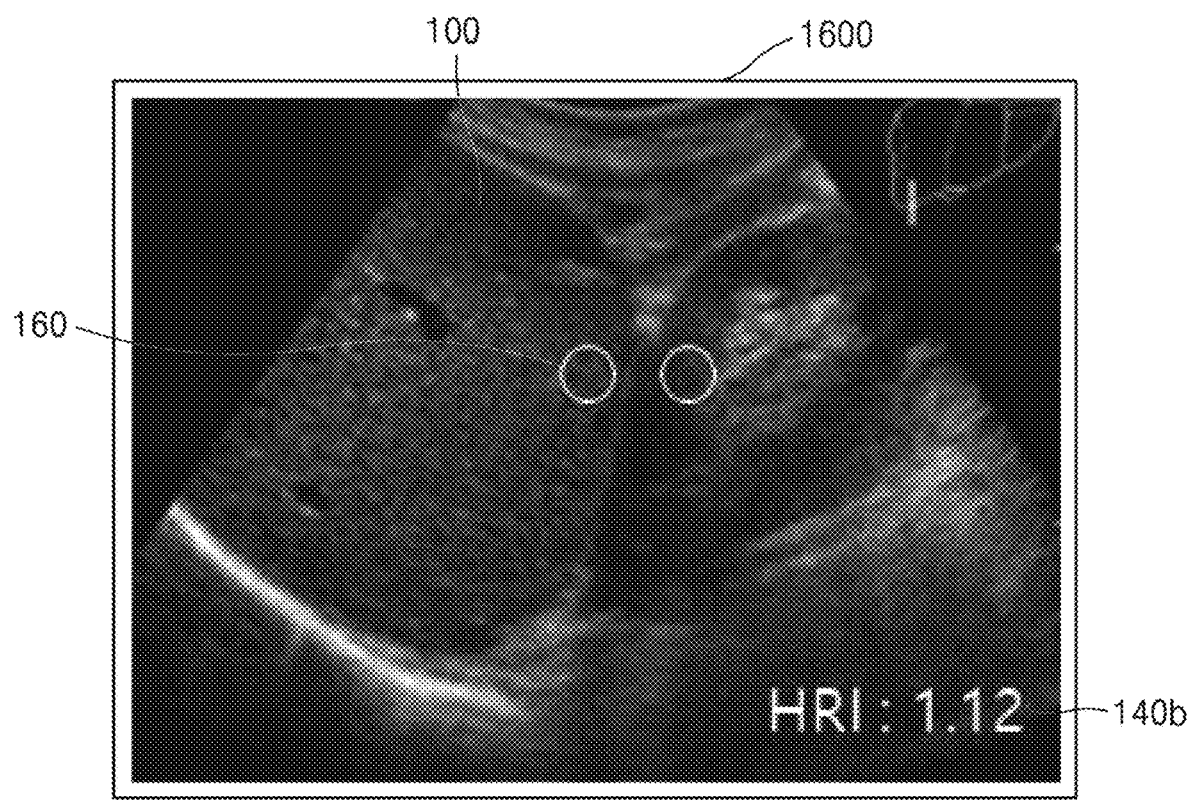

FIGS. 9A and 9B are diagrams illustrating examples of an ultrasound imaging device 1000 of the present disclosure displaying a type of a diagnostic algorithm suitable for an ultrasound image 100 and suitability.

Referring to FIG. 9A, the ultrasound imaging device 1000 may display the ultrasound image 100, an algorithm measurement value UI 140*a*, and a region-of-interest (ROI) UI 150 on a display 1600. In an embodiment, the ultrasound imaging device 1000 may perform a diagnostic algorithm based on a user input or may automatically determine a diagnostic algorithm appropriate for diagnosing a lesion using the ultrasound image 100 as an input image and perform the determined diagnostic algorithm. In the embodiment of FIG. 9A, the ultrasound imaging device 1000 may perform the TAI algorithm and the TSI algorithm.

The algorithm measurement value UI 140*a* may display a measurement value measured by the ultrasound image 100 by performing a diagnostic algorithm. In the embodiment of FIG. 9A, the algorithm measurement value UI 140*a* may display 0.71 that is a numerical value of attenuation of the ultrasound image 100 measured by the TAI algorithm, and 0.68 that is a numerical value of scattering of the ultrasound image 100 measured by the TSI algorithm.

The ROI UI 150 may display an ROI among all views of the ultrasound image 100. In an embodiment, the processor 1400 may automatically determine a location and range of the ROI based on an anatomical view of the ultrasound image 100, and display the location and range of the determined ROI on the display 1600 through the ROI UI 150.

Referring to FIG. 9B, the ultrasound imaging device 1000 may display an ultrasound image 100, an algorithm measurement value UI 140*b*, and a characteristic point UI 160 on a display 1600. In an embodiment of FIG. 9B, the ultrasound imaging device 1000 may perform an HRI algorithm. The HRI algorithm is an algorithm for diagnosing fatty liver based on a ratio between pixel values of an image of the liver and pixel values of an image of the kidneys in an ultrasound image of the liver.

The algorithm measurement value UI 140*b* may display a measurement value measured by the ultrasound image 100 by performing a diagnostic algorithm. In the embodiment of FIG. 9B, the algorithm measurement value UI 140*b* may display 1.12 as the ratio between the pixel values of the image of the liver and the pixel values of the image of the kidneys, which is measured by the HRI algorithm.

The characteristic point UI 160 may display a position of a characteristic point detected from the ultrasound image 100. In an embodiment, the processor 1400 of the ultrasound imaging device 1000 may obtain seed information, such as a position of at least one anatomical structure and a position of an outline, from the ultrasound image 100 using an image recognition technique or a machine-learning-based training model such as a DNN, and detect characteristic points based on the seed information. The processor 1400 may display the position of the detected characteristic point on the display 1600 through the characteristic point UI 160.

Figure 10:
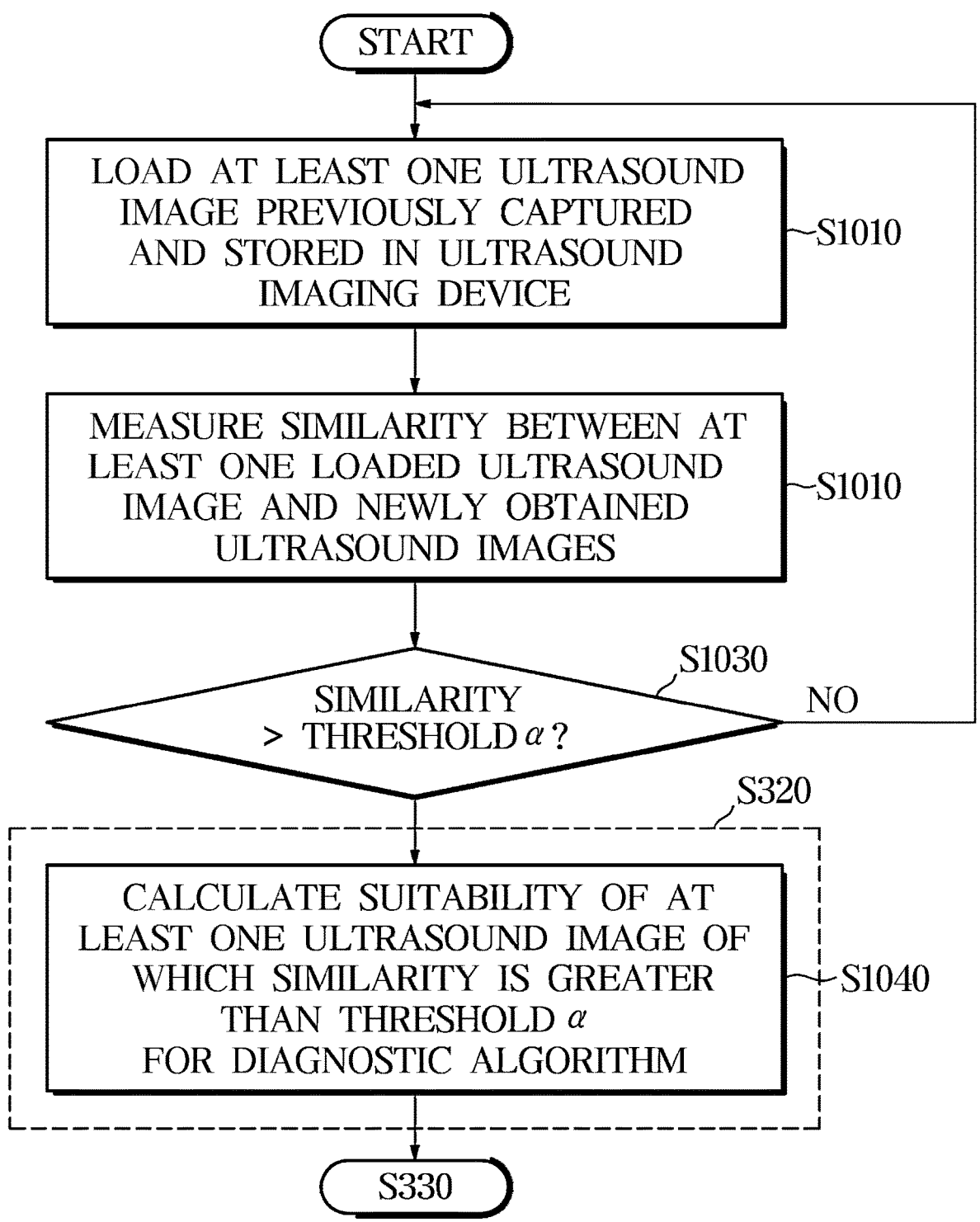
FIG. 10 is a flowchart of an example of an ultrasound imaging device of the present disclosure measuring a similarity between a stored ultrasound image and an obtained ultrasound image and calculating suitability for a diagnostic algorithm based on the measured similarity.

FIG. 10 is a flowchart of an example of an ultrasound imaging device 1000 of the present disclosure measuring a similarity between a stored ultrasound image and an obtained ultrasound image and calculating suitability for a diagnostic algorithm based on the measured similarity. The embodiment of FIG. 10 relates to operations additionally performed between operations S310 and S330 of FIG. 3. Operation S1010 is performed after operation S310 of FIG. 3.

In operation S1010, the ultrasound imaging device 1000 loads at least one previously captured and stored ultrasound image. In an embodiment, the processor 1400 (see FIG. 2) of the ultrasound imaging device 100) may obtain at least one ultrasound image previously captured and stored in the storage 1700 (see FIG. 2) from the storage 1700. In an embodiment, the processor 1400 may identity an anatomical view of an ultrasound image that is currently being captured, classify a view of an image based on the identified anatomical view, and load at least one ultrasound image captured at the same view as the view of the image among previously captured ultrasound images stored in the storage 1700.

In operation S1020, the ultrasound imaging device 1000 measures a similarity between at least one loaded ultrasound image and a plurality of newly obtained ultrasound images. In an embodiment, the processor 1400 may measure a similarity between at least one loaded ultrasound image and a plurality of newly obtained ultrasound images using a well-known image processing technique. However, embodiments are not limited thereto, and a similarity between at least one loaded ultrasound image and a plurality of newly obtained ultrasound images may be measured using a well-known DNN, e.g., an image-based CNN, a recurrent neural network (RNN) or a support vector machine (SVM).

In operation S1030, the ultrasound imaging device 1000 compares the measured similarity with a preset threshold a to determine whether a size of the similarity is greater than the threshold a.

When the size of the similarity is greater than the threshold a (operation S1030), the ultrasound imaging device 1000 calculates suitability of at least one ultrasound image of which the similarity is greater than the threshold a for a diagnostic algorithm (S1040). Operation S1040 is an example of operation S320 of FIG. 3. Unlike operation S320 of FIG. 3, in operation S1040, suitability of all a plurality of newly obtained ultrasound images for the diagnostic algorithm is not calculated but suitability of only at least one ultrasound image of which the similarity with at least one ultrasound image loaded from the storage 1700 is greater than or equal to a certain level for the diagnostic algorithm among the plurality of newly obtained ultrasound images is calculated. That is, the number of ultrasound images that are subject to suitability calculation for the diagnostic algorithm in operation S1040 is less than that in operation S320 of FIG. 3.

When the similarity is less than the threshold a, operation S1010 is returned back to and performed again.

In the embodiment of FIG. 10, the ultrasound imaging device 1000 may measure a similarity between an ultrasound image of the same patient or the same target part that was previously captured and stored in the storage 1700 and a newly captured and obtained ultrasound image thereof, i.e., parameters used to perform the diagnostic algorithm are used, thereby increasing the accuracy of determining an input ultrasound image. When the ultrasound image of the same patient that was previously captured is used, a user may be induced to newly capture an ultrasound image of the same patient to be suitable for diagnosing a prognosis, and the difference between the previously captured ultrasound image and the newly captured ultrasound image may be reduced to improve the reliability of prognosis management of the patient.

Figure 11A:
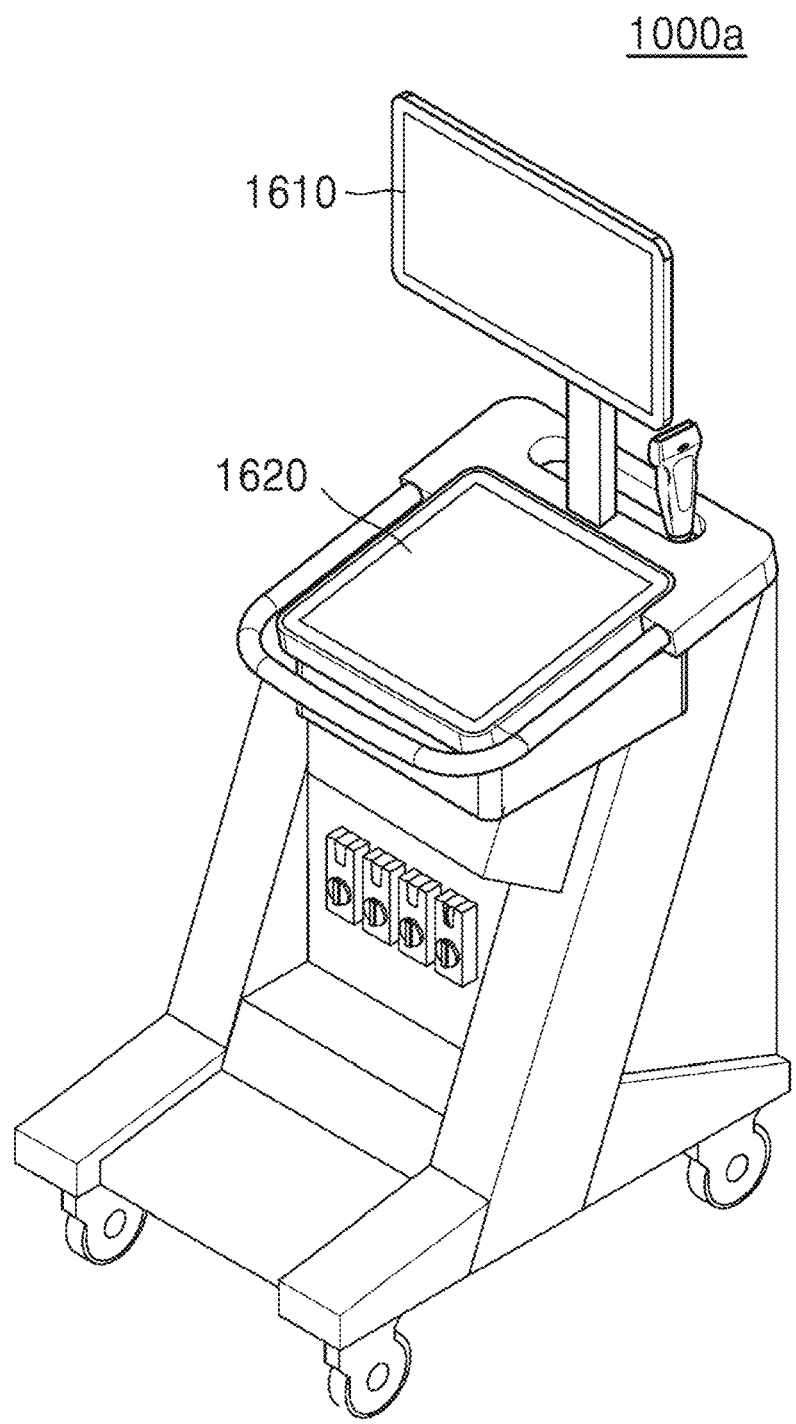
FIGS. 11A to 11C are diagrams illustrating ultrasound diagnostic devices.
Figure 11B:
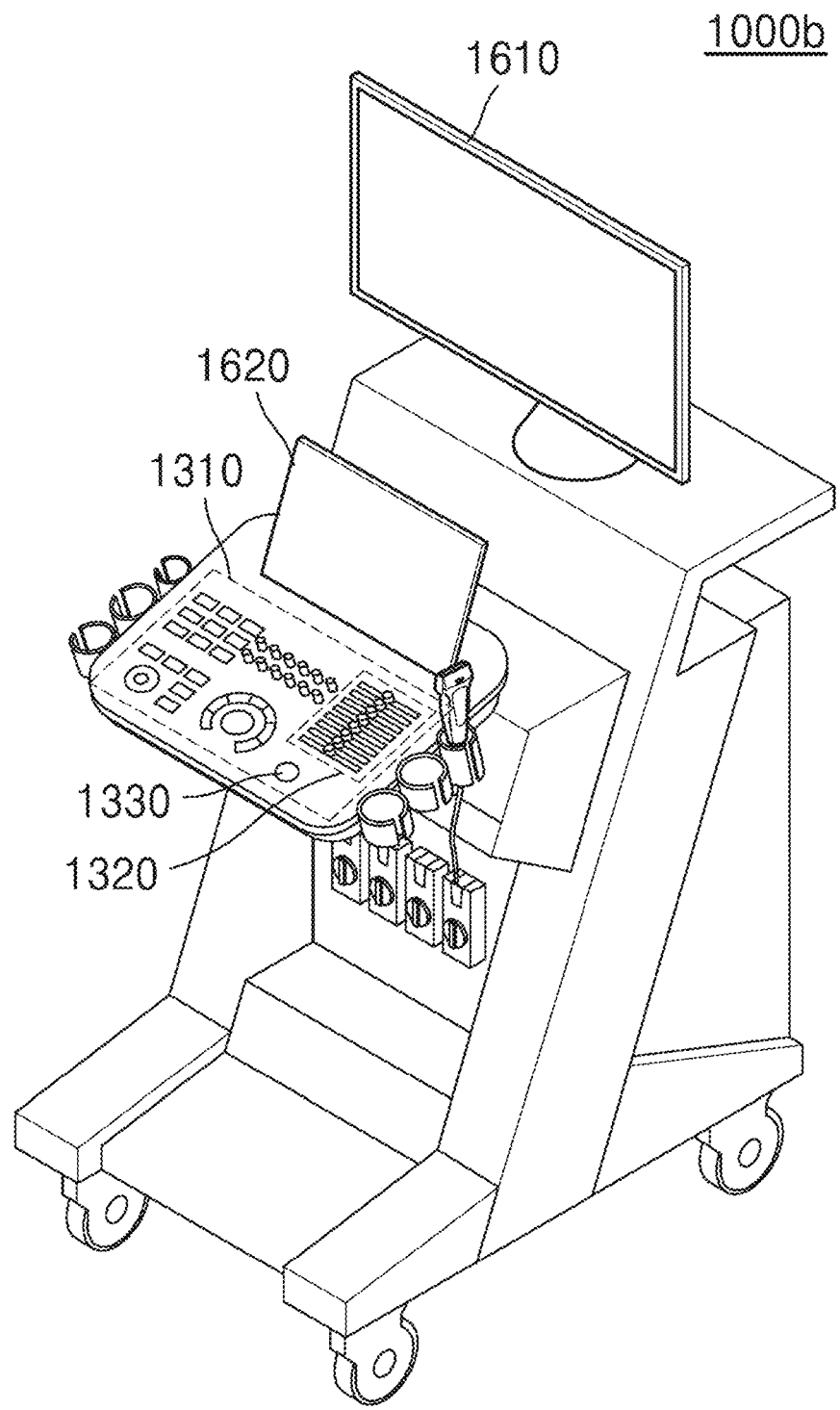
Figure 11C:
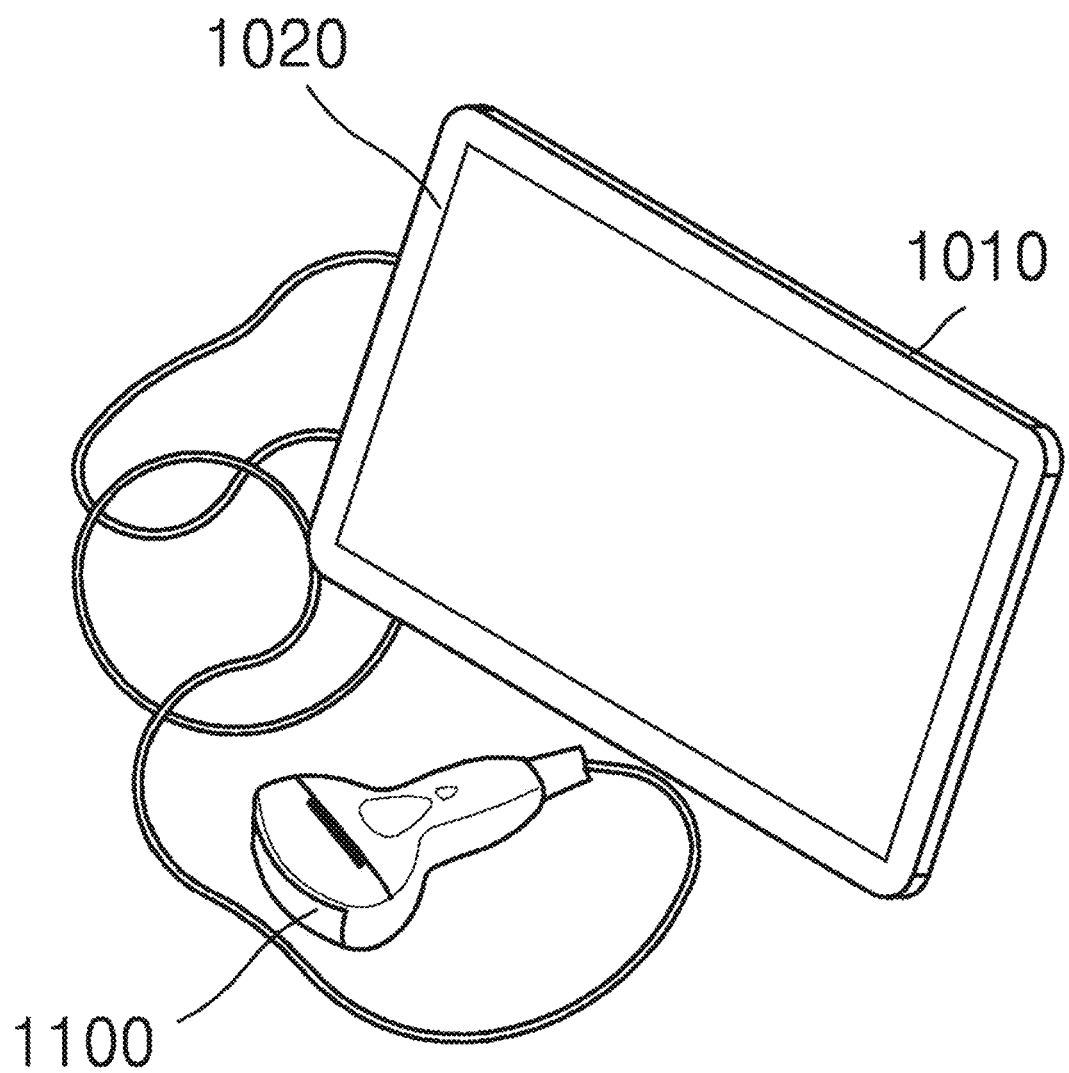

FIGS. 11A to 11C are diagrams illustrating ultrasound diagnostic devices 1000A, 1000B, and 1000C according to an embodiment.

Referring to FIGS. 11A and 11B, the ultrasound diagnostic devices 1000a and 1000b may each include a main display 1610 and a sub-display 1620. One of the main display 1610 and the sub-display 1620 may be embodied as a touch screen. The main display 1610 and the sub-display 1620 may display an ultrasound image and various types of information processed in the ultrasound diagnostic device 1000a or 1000b. The main display 1610 and the sub-display 1620 may each be embodied as a touch screen and provide a GUI to receive data for controlling the ultrasound diagnostic device 1000a or 1000b from a user. For example, the main display 1610 may display an ultrasound image, and the sub-display 1620 may display, in a GUI form, a control panel for controlling the displaying of the ultrasound image. The sub-display 1620 may receive data for controlling displaying of an image through the control panel displayed in a GUI form. The ultrasound diagnostic devices 1000a and 1000b may each control displaying of an ultrasound image on the main display 1610 using input control data.

Referring to FIG. 11B, the ultrasound diagnostic device 1000b may further include a control panel 1310, as well as the main display 1610 and the sub-display 1620. The control panel 1310 may include a button, a trackball, a jog switch, a knob, etc. and may receive data for controlling the ultrasound diagnostic device 1000b from a user. For example, the control panel 1310 may include a time gain compensation (TGC) button 1320, a freeze button 1330, and the like. The TGC button 1320 is a button for setting a TGC value according to a depth of an ultrasound image. When an input of the freeze button 1330 is detected during scanning of an ultrasound image, the ultrasound diagnostic device 1000b may maintain displaying of a frame image corresponding to a point in time when the input of the freeze button 1330 is detected.

The button, the trackball, the jog switch, the knob, and the like included in the control panel 1310 may be provided in a GUI form on the main display 1610 or the sub-display 1620.

Referring to FIG. 11C, the ultrasound diagnostic device 1000c may also be implemented as a portable type. Examples of the ultrasound diagnostic device 1000c of the portable type may include, but are not limited to, a smart phone, a laptop computer, a PDA, a tablet PC, and the like, which include a probe and an application.

The ultrasound diagnostic device 1000c includes an ultrasound probe 1100 and a main body 1010, and the ultrasound probe 1100 may be connected to a side of the main body 1010 via wire or wirelessly. The main body 1010 may include a touch screen 1020. The touch screen 1020 may display an ultrasound image, various types of information processed in the ultrasound diagnostic device 1000c, a GUI, and the like.

The embodiments of the present disclosure set forth herein may be implemented as a software (S/W) program stored in a computer-readable storage medium and including instructions.

The computer is a device capable of calling an instruction stored in a storage medium and performing an operation of an embodiment of the present disclosure set forth herein according to the called instruction, and may include the ultrasound imaging device 1000 according to the embodiments of the present disclosure set forth herein.

The computer-readable storage medium may be provided as a non-transitory storage medium. Here, the term "non-transitory" means that the storage medium does not include a signal and is tangible but does not indicate whether data is stored in the storage medium semi-permanently or temporarily.

The ultrasound imaging device 1000 and an operation method thereof according to the embodiments of the present disclosure set forth herein may be provided by being included in a computer program product. The computer program product may be traded as a product between a seller and a purchaser.

The computer program product may include an S/W program and a computer-readable storage medium storing the S/W program. For example, the computer program product may include a product (e.g., a downloadable application) in the form of a software program electronically distributed through a manufacturer of the ultrasound imaging device 1000 or an electronic market (e.g., Google Play Store or App Store). For electronic distribution of the computer program product, at least part of the S/W program may be stored in a storage medium or temporarily generated. In this case, the storage medium may be a storage medium of a server of the manufacturer, a server of the electronic market, or a storage medium of a relay server that temporarily stores the S/W program.

The computer program product may include a storage medium of a server or a storage medium of a device in a system consisting of the server and the device (e.g., an ultrasound imaging device). Alternatively, when there is a third device (e.g., a smart phone) capable of establishing communication with the server or the device, the computer program product may include a storage medium of the third device. Alternatively, the computer program product may include a S/W program transmitted from the server to the device or the third device or transmitted from the third device to user equipment.

In this case, the server, the device or the third device may execute the computer program product to perform the methods according to the embodiments set forth herein. Alternatively, two or more among the server, the device, and the third device may execute the computer program product to perform the methods according to the embodiments set forth herein in a distributed manner.

For example, the server (e.g., a cloud server or an artificial intelligence server) may execute the computer program product stored in the server to control the device communicatively connected to the server to perform the methods according to the embodiments set forth herein.

As another example, the third device may execute the computer program product to control the device communicatively connected to the third device to perform the methods according to the embodiments set forth herein.

When the third device executes the computer program product, the third device may download the computer program product from the server and execute the downloaded computer program product. Alternatively, the third device may execute the computer program product provided in a preloaded state to perform the methods according to the embodiments set forth herein.

The embodiments set forth herein may be embodied as a computer-readable recording medium storing computer-executable instructions and data. The instructions may be stored in the form of program code, and a certain program module may be created to perform a certain operation when the instructions are executed by a processor. In addition, operations according to the embodiments set forth herein may be performed when the instructions are executed by a processor.

The embodiments set forth herein have been described above with reference to the accompanying drawings. It will be understood by those of ordinary skill in the technical field to which the present disclosure pertains that embodiments of the present disclosure may be implemented in different forms than those of the embodiments set forth herein without departing from the technical idea or essential features of the present disclosure. The embodiments set forth herein are only examples and should not be interpreted in a restrictive manner.

The invention claimed is:

1. An operation method of an ultrasound imaging device, comprising:
    obtaining, by a processor, a plurality of ultrasound images by receiving an echo signal reflected from an object using an ultrasound probe and image-processing the received echo signal;
    obtaining, by the processor, a setting value of a scan parameter of each of the plurality of ultrasound images;
    calculating, by the processor, suitability of each of the plurality of ultrasound images as an input image for a diagnostic algorithm for diagnosing a lesion based on the setting value of the scan parameter of each of the plurality of ultrasound images, wherein the diagnostic algorithm includes at least one of a hepatorenal index (HRI) algorithm, a tissue scatter distribution image (TSI) algorithm or a tissue attenuation image (TAI) algorithm, and wherein the suitability is a numerical value;
    displaying, by the processor, the calculated suitability of each of the plurality of ultrasound images on a display of the ultrasound imaging device;
    automatically freezing, by the processor, at least one ultrasound image among the plurality of ultrasound images based on the calculated suitability of the at least one ultrasound image being greater than a preset threshold;
    determining, by the processor, the at least one frozen ultrasound image as an input ultrasound image to be input to the diagnostic algorithm among the plurality of ultrasound images;
    inputting, by the processor, the determined input ultrasound image to the diagnostic algorithm; and
    measuring, by the processor, a numerical value indicating at least one of a hepatorenal index, a degree of scattering, or a degree of attenuation of the determined input ultrasound image using the diagnostic algorithm.

2. The operation method of claim 1, wherein the calculating of the suitability further comprises calculating, by the processor, the suitability of each of the plurality of ultrasound images for the diagnostic algorithm based on at least one of an anatomical view or, quality.

3. The operation method of claim 1, wherein the calculating of the suitability further comprises calculating, by the processor, the suitability of each of the plurality of ultrasound images for the diagnostic algorithm based on at least one of echogenicity, an anatomical view, a motion artifact, or a rate of shadows of each of the plurality of ultrasound images.

4. The operation method of claim 1, wherein the calculating of the suitability comprises calculating, by the processor, the suitability of each of the plurality of ultrasound images for the diagnostic algorithm by using a pre-trained deep neural network using the plurality of ultrasound images as input data,
    wherein the pre-trained deep neural network comprises an artificial neural network trained by using a plurality of previously obtained ultrasound images as input data, a numerical value of the suitability as an output value and a numerical value obtained by normalizing a magnetic resonance imaging derived proton density fat fraction (MRI-PDFF) value or a value of a biopsy result as ground truth,
    wherein the plurality of previously obtained ultrasound images, which are used as the input data for training the deep neural network, were acquired prior to obtaining the plurality of ultrasound images used as the input data for calculating the suitability of each of the plurality of ultrasound images for the diagnostic algorithm and stored in the memory of the ultrasound imaging device.

5. The operation method of claim 1, wherein the determining of the ultrasound image to be input to the diagnostic algorithm among the plurality of ultrasound images comprises:
    receiving, by the processor, a user input for determining the input ultrasound image to be input to the diagnostic algorithm among the plurality of ultrasound images based on all of the suitability of each of the plurality of ultrasound images being equal to or less than the preset threshold.

6. The operation method of claim 1, further comprising:
    loading, by the processor, at least one ultrasound image previously captured and stored in a memory of the ultrasound imaging device;
    measuring, by the processor, a similarity between the at least one loaded ultrasound image and the plurality of obtained ultrasound images; and determining, by the processor, at least one ultrasound image of which the measured similarity is greater than a threshold preset in relation to the similarity,
wherein the calculating of the suitability comprises calculating suitability of the at least one determined ultrasound image for the diagnostic algorithm.

7. An ultrasound imaging device comprising:
an ultrasound probe configured to transmit an ultrasound signal to an object and receive an echo signal reflected from the object;
a display;
a memory storing at least one instruction; and
a processor configured to execute the at least one instruction stored in the memory,
wherein the processor is configured to:
obtain a plurality of ultrasound images by image-processing the echo signal;
obtain a setting value of a scan parameter of each of the plurality of ultrasound images:
calculate suitability of each of the plurality of ultrasound images as an input image for a diagnostic algorithm for diagnosing a lesion based on the setting value of the scan parameter of each of the plurality of ultrasound images, wherein the diagnostic algorithm includes at least one of a hepatorenal index (HRI) algorithm, a tissue scatter distribution image (TSI) algorithm or a tissue attenuation image (TAI) algorithm, and wherein the suitability is a numerical value;
control the display to display the calculated suitability of each of the plurality of ultrasound images on the display;
based on the calculated suitability of at least one ultrasound image being greater than a preset threshold, automatically freezing the at least one ultrasound image among the plurality of ultrasound images;
determine the at least one frozen ultrasound image as an input ultrasound image to be input to the diagnostic algorithm among the plurality of ultrasound images;
input the determined input ultrasound image to the diagnostic algorithm; and
measure a numerical value indicating at least one of a hepatorenal index, a degree of scattering, or a degree of attenuation of the determined input ultrasound image using the diagnostic algorithm.

8. The ultrasound imaging device of claim 7, wherein the processor is further configured to calculate the suitability of each of the plurality of ultrasound images for the diagnostic algorithm based on at least one of an anatomical view or, quality.

9. The ultrasound imaging device of claim 7, wherein the processor is further configured to calculate the suitability of each of the plurality of ultrasound images for the diagnostic algorithm based on at least one of echogenicity, an anatomical view, a motion artifact, or a rate of shadows of each of the plurality of ultrasound images.

10. The ultrasound imaging device of claim 7, wherein the processor is configured to calculate the suitability of each of the plurality of ultrasound images for the diagnostic algorithm by using a pre-trained deep neural network using the plurality of ultrasound images as input data, and
wherein the pre-trained deep neural network comprises an artificial neural network trained by using a plurality of previously obtained ultrasound images as input data, a numerical value of the suitability as an output value and a numerical value obtained by normalizing a magnetic resonance imaging derived proton density fat fraction (MRI-PDFF) value or a value of a biopsy result as ground truth,
wherein the plurality of previously obtained ultrasound images, which are used as the input data for training the deep neural network, were acquired prior to obtaining the plurality of ultrasound images used as the input data for calculating the suitability of each of the plurality of ultrasound images for the diagnostic algorithm and stored in the memory of the ultrasound imaging device.

11. The ultrasound imaging device of claim 7, further comprising a user inputter including at least one of a button, a touch pad, or a control panel, and
wherein the processor is further configured to, based on all of the suitability of each of the plurality of ultrasound images being equal to or less than the preset threshold obtain a user input for determining the input ultrasound image to be input to the diagnostic algorithm among the plurality of ultrasound images through the user inputter.

12. The ultrasound imaging device of claim 7, wherein the processor is configured to, based on all of the suitability of each of the plurality of ultrasound images being equal to or less than the preset threshold, control the display to display a user interface (UI) for receiving the user input for determining the input ultrasound image to be input to the diagnostic algorithm among the plurality of ultrasound images through the user inputter.

13. One or more non-transitory computer-readable recording media storing computer-executable instructions that, when executed by one or more processors individually or collectively, cause the one or more processors to perform the method of claim 1 in a computer.

* * * * *